US006833648B2

(12) United States Patent
Gorohata et al.

(10) Patent No.: US 6,833,648 B2
(45) Date of Patent: Dec. 21, 2004

(54) SEQUENTIALLY JOINED-SEGMENT COIL FOR ROTARY ELECTRICAL MACHINE WITH HIGH DEGREE OF ELECTRICAL INSULATION

(75) Inventors: Tetsuya Gorohata, Anjo (JP); Shinji Kouda, Kariya (JP); Masahiro Seguchi, Oobu (JP); Kanehisa Urano, Okazaki (JP); Hitoshi Hirano, Anjo (JP); Youichi Kamakura, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/602,070

(22) Filed: Jun. 24, 2003

(65) Prior Publication Data

US 2004/0041491 A1 Mar. 4, 2004

(30) Foreign Application Priority Data

Jun. 25, 2002 (JP) ........................................ 2002-184800

(51) Int. Cl.[7] .............................. H02K 3/12; H02K 3/04
(52) U.S. Cl. ........................ 310/180; 310/198; 310/201; 310/208
(58) Field of Search ................................ 310/179, 180, 310/198, 201, 208, 254

(56) References Cited

U.S. PATENT DOCUMENTS

| 4,117,707 A | | 10/1978 | Kolesar et al. | |
|---|---|---|---|---|
| 4,908,541 A | * | 3/1990 | Kawazoe et al. | 310/270 |
| 5,955,804 A | * | 9/1999 | Kusase et al. | 310/59 |
| 5,965,965 A | * | 10/1999 | Umeda et al. | 310/52 |
| 6,166,461 A | * | 12/2000 | Kusase et al. | 310/58 |
| 6,177,747 B1 | | 1/2001 | Maeda et al. | |
| 6,201,332 B1 | | 3/2001 | Umeda et al. | |
| 6,249,956 B1 | | 6/2001 | Maeda et al. | |
| 6,403,921 B1 | | 6/2002 | Maeda et al. | |
| 6,441,526 B1 | * | 8/2002 | Oohashi et al. | 310/184 |
| 6,515,392 B2 | * | 2/2003 | Ooiwa | 310/179 |
| 6,522,043 B2 | * | 2/2003 | Masegi | 310/180 |
| 6,770,999 B2 | * | 8/2004 | Sakurai | 310/208 |

FOREIGN PATENT DOCUMENTS

| EP | 0 945 962 A1 | 9/1999 |
|---|---|---|
| EP | 1 005 137 A1 | 5/2000 |
| EP | 1 107 427 A2 | 6/2001 |
| EP | 1 128 527 A1 | 8/2001 |
| EP | 1 179 880 A2 | 2/2002 |
| JP | A 2000-92766 | 3/2000 |
| JP | A 2000-139049 | 5/2000 |
| JP | B1 3104700 | 9/2000 |
| JP | B2 3118837 | 10/2000 |
| JP | B2 3196738 | 6/2001 |
| JP | A 2001-245446 | 9/2001 |

* cited by examiner

*Primary Examiner*—Tran Nguyen
(74) *Attorney, Agent, or Firm*—Oliff & Berridge, PLC

(57) ABSTRACT

A sequentially joined-segment coil for a rotary electric machine such an electric motor is provided. The coil has an end portion which is made up of heads of conductor segments and projects from an end of a core. The heads of conductor segments have turns or bulges. The bulges are lapped over one another in various forms or shifted in location in an axis direction of the core, thereby permitting the core to be decreased in diameter, which provides for decreases in size and weight of the rotary electrical machine.

14 Claims, 16 Drawing Sheets

SEQUENTIALLY JOINED-SEGMENT COIL FOR ROTARY ELECTRICAL MACHINE WITH HIGH DEGREE OF ELECTRICAL INSULATION

BACKGROUND OF THE INVENTION

1. Technical Field of the Invention

The present invention relates generally to a sequentially joined-segment coil of a rotary electric machine and a production method thereof which ensures a high degree of electrical insulation and allows decreases in size and weight thereof.

2. Background Art

Sequentially joined-segment stator coils have been proposed which are made by conductor segments inserted in slots in a stator core whose ends are joined in sequence. For instance, Japanese Patent No. 3118837 (U.S. Pat. No. 6,249,956), assigned to the same assignee as that of this application, discloses a production method of joining U-shaped conductor segments in sequence to make a stator coil.

The sequentially joined segment stator coil, as taught in the above patents, is made by inserting a pair of legs of each conductor segment into two of slots of a core located at an interval away from each other which is substantially equivalent to a magnetic pole pitch of a rotor, bending end portions of the legs projecting from the slots in a circumferential direction of the core, and joining the end portions of the conductor segments in series.

The conductor segments each consist of a U or V-shaped head (also called a turn), a pair of side conductor portions extending from the head to be inserted into two of the slots of the core from an axial direction of the core, and end portions which project from the side conductor portions toward the other side of the slots and extend in the circumferential direction of the core. The projecting end portions are joined in pair. In the following discussion, the side conductor portion and the projecting end portion will also be referred to as a leg as a whole, the heads of the conductor segments will also be referred to as a segment head-side coil end of the stator coil, and the projecting end portions will also be referred to as a segment end-side coil end of the stator coil.

Japanese Patent Publication No. 3118837 (U.S. Pat. No. 6,249,956) also discloses a method of forming slant portions of a head of each of a small-sized conductor segment and a large-sized segment. The formation of the slant portions is achieved by fitting a total of four legs of a set of the small-sized conductor segment and the large-sized segment extending over the small-sized segment within two rings arrayed coaxially with each other and rotating the rings in opposite directions to spread the legs in circumferential directions of the rings.

Japanese Patent First Publication No. 2000-139049 (U.S. Pat. No. 6,177,747) discloses a method of forming the slant portions of the head of each conductor segment which is achieved by fitting a total of four legs of a set of the small-sized conductor segment and the large-sized segment extending over the small-sized segment within four rings arrayed coaxially with each other and rotating the rings in opposite directions to spread the legs of each conductor segment in circumferential directions of the rings.

Japanese Patent No. 3104700 (U.S. Pat. No. 6,403,921) discloses welding two of tips of end portion of conductor segments arrayed adjacent to each other in the radius direction of a stator core and teaches use of a restraint member which is disposed between the adjacent two of the tips to secure a desired orientation of the welded tips.

Japanese Patent No. 3118837 (U.S. Pat. No. 6,249,956) discloses bending a conductor bar through 180° to produce a U-shaped segment. Japanese Patent First Publication No. 2001-245446 teaches bending wire 180° many times to make the same coil as the above described sequentially joined-segment stator coil. This type of stator coil eliminates the need for a welding process, but requires use of a stator coil with open slots indispensably.

Japanese Patent Fist Publication No. 2000-92766 (U.S. Pat. No. 6,201,332) discloses a sequentially joined-segment stator coil in which six legs of conductor segments are aligned within each slot of a stator core in a radius direction of the stator core.

An example of the production methods of the sequentially joined-segment stator coil as taught in the above publications will be discussed below in detail.

First, a required number of pine needle-like conductor segments are prepared. Each of the conductor segments is formed into a U-shape one with side conductor portions extending at substantially a magnetic pole pitch interval away from each other. The side conductor portions of each conductor segment are placed spatially in alignment with two of the slots formed in the core, respectively, (i.e., in a circumferential direction of the core) for simultaneous insertion of the side conductor portions into the slots. These steps may be achieved with a pair of coaxially arrayed rings with slots, as illustrated in FIG. 3 of Japanese Patent No. 3118837. Specifically, legs of each conductor segment are fitted in two of the slots aligned in a radius direction of the rings. Next, the rings are turned relative to each other through a given angle equivalent to a magnetic pole pitch to spread the legs, thereby forming the U-shaped conductor segment.

Subsequently, the head of each of the U-shaped conductor segments is held. The legs are drawn from the slots and then inserted into the slots of the core.

Next, end portions of the legs projecting from the slots are bent in the circumferential direction of the core through half a magnetic pole pitch. Such bending may be achieved with a plurality of coaxially arrayed rings with slots, as illustrated in FIGS. 4 and 5 of Japanese Patent No. 03196738. Specifically, tips of the projecting end portions of the legs are inserted into the slots of the rings. The rings are rotated in the circumferential direction by half a magnetic pole pitch (i.e., an electrical angle of $\pi/2$) to bent the projecting end portions in the circumferential direction through half the magnetic pole pitch. It is advisable that the rotation of the rings be performed while urging the rings toward the projecting end portions (i.e., the axial direction of the core) for increasing the radius of curvature of the turn of each conductor segment. Next, the projecting end portions are welded in a given sequence, thereby forming an endless phase coil. Any one of the heads of the U-shaped conductor segments is cut to define coil terminals. If the coil terminals are made longer and bent in the circumferential direction, they may be employed as a neutral point connecting line. The reason that the coil terminals are provided in the segment head-side coil end is because if the coil terminals are provided in the segment end-side coil end, they will interface with welding of the end portions of the conductor segments.

The above sequentially joined-segment stator coil is usually employed as a stator coil of automotive ac generators and has suffered from the following drawback.

Each of the pine needle-like conductor segments for use in making the U-shaped conductor segment has the 180° bent head which is greater in width than a total width of legs of each of the conductor segments because the head is bent with a certain curvature. This increases the damage to insulating coatings on the heads of the conductor segment. The problems is also encountered by the multi-bend coils as taught in Japanese Patent First Publication No. 2001-245446.

Typically, the legs of each of the conductor segments are placed within one of slots of the stator core at different locations aligned in the radius direction of the stator core. Alternatively, the set of the large-sized and small-sized conductor segments has a total of four legs disposed within one of the slots at four adjacent locations.

Usually, electric motors used to drive automotive vehicles is supplied with power from a high-voltage battery. It is, thus, very difficult to decrease the curvature of the heads of the conductor segments as compared with typical automotive ac generators, which results in a great increase in diameter of the segment head-side coil end of the stator coil made up of the heads of the conductor segments.

The segment head-side coil end of the conventional sequentially joined-segment stator coils has some of the conductor segments arrayed in the radius direction of the stator core, so that a pitch between portions of the conductor segments at the segment head-side coil end will be greater than a radius-wise width of the tips of the heads of the conductor segments. In a case of electric motor used to drive automotive vehicles, a given clearance is preferably provided between adjacent two of the heads of the conductor segments for ensuring the electrical insulation of the stator coil.

For the reasons as described above, the pitch between portions of the conductor segments placed within each slot of the stator core must be equal to the pitch between the tips of the heads of the conductor segments, thus resulting in a decreased slot space factor of the stator core and an increased diameter of the stator core which leads to increases in size and weight of the motor.

SUMMARY OF THE INVENTION

It is therefore a principal object of the invention to avoid the disadvantages of the prior art.

It is another object of the invention to provide a sequentially joined-segment stator coil for a rotary electric machine which is designed to ensure a desired degree of electrical insulation of a segment head-side coil end of the stator coil and capable of decreasing the size and weight thereof and a production method thereof.

According to one aspect of the invention, there is provided a sequentially joined-segment stator coil which may be employed in a rotary electrical machine such as an electrical motor. The stator coil comprises: (a) a stator core having opposed ends and slots formed at given intervals in a circumferential direction of the stator core, each of the slots defining therein even segment-inserted is positions which are aligned in a radius direction of the stator core; and (b) a plurality of segments placed in the slots of the stator core, the segments being joined in sequence to form turns of each of M (=an integer more than two) phase coils. Each of the segments includes a pair of conductor portions each of which is inserted into one of two of the slots spaced from each other at a given interval, a head portion extending from the pair of conductor portions outside one of the ends of the stator core to form a segment head-side coil end, and a pair of end portions each of which extends from one of the pair of conductor portions outside the other end of the stator core to form a segment end-side coil end. Each of the head portions is made up of a substantially U-shaped tip portion and a pair of slant portions which continue from ends of the head portion, slant to a circumferential and an axial direction of the stator core, and lead to the conductor portions, respectively. Each of the end portions is made up of slant end portions slanting from the two of the slots to the circumferential and axial directions and tips each of which continues from one of the slant end portions and is joined to one of the tips of the end portions of another of the segments. The segment head-side coil end includes a plurality of sets of the head portions arrayed in the radius direction of the stator core, as viewed in the circumferential direction of the stator core. The segment end-side coil end includes a plurality of sets of the end portions arrayed in the radius direction, as viewed in the circumferential direction of the stator core.

Each of the tip portions of the head portions of the segments bulges more than a corresponding one of the pairs of conductor portions in the radius direction of the stator core. A radius-wise pitch between two of the tip portions adjacent to each other in the radius direction is greater than a width of the tip portions in the radius direction. A radius-wise pitch between the slant portions of two of the head portions arrayed adjacent to each other in the radius direction of the stator core is smaller than the width of the tip portions in the radius direction.

Specifically, the radius-wise pitch between the two of the tip portion is greater than the width of the tip portion and the radius-wise pitch between the slant portions. This geometry is established by increasing the pitch of the slant portions as getting away from the end of the stator core. This allows a desired number of turns of the stator coil to be installed within a motor housing without increasing the diameter of the stator core and provides a desired degree of electrical insulation of the segment head-side coil end of the stator coil. Additionally, the increase in interval between the slant portions of the head portions facilitates flow of cooling air passing through the slant portions, thus resulting in greatly improved cooling capability of the stator coil.

The segments may be made up of two types: a large-sized segment and a small-sized segment. The conductor portions of each of the small-sized conductor segments may be placed at two different locations defined adjacent to each other in the radius direction of the stator core. The conductor portions of each of the large-sized conductor segments may be placed at two different locations provided inside and outside of the locations of the conductor portions of the small-sized segment. In this case, each of the small-sized segments and one of the large-sized segments may be viewed in the circumferential direction of the stator core as a segment set. The same beneficial effects may also be obtained if each of the segment as referred to in the above stator coil is considered as the segment set.

The above described arrangements of the segments may be used with the multi-bend coils as taught in Japanese Patent First Publication No. 2001-245446.

In the preferred mode of the invention, the radius-wise pitch between the adjacent two head portions at the slant portions thereof increases as getting away from the end of the stator core in an axial direction of the stator core. Outside ones of the pairs of slant portions of the head portions in the radius direction of the stator core lean outwardly at an angle to an axial direction of the stator core which is greater than that of inside ones of the slant portions. The outward leaning of the slant portions causes the pitch between the conductor portions to be increased, thus facilitating ease of manufacture.

The radius-wise pitch between the adjacent two head portions at the slant portions thereof increases as getting away from the end of the stator core in an axial direction of the stator core. Inside ones of the pairs of slant portions of the head portions in the radius direction of the stator core may alternatively lean inwardly at an angle to an axial direction of the stator core which is greater than that of outside ones of the slant portions.

The slant portions of the head portions may be bent or curved in the radius direction of the stator core.

The segments is broken down into a plurality of segment sets each made up of a small-sized segment with a small head and a large-sized segment with a large head extending over the small head of the small-sized segment in the circumferential direction of the stator core. The segment sets is broken down into a plurality of segment set groups arrayed in the radius direction of the stator core. The segment sets in each of the segment set groups are arrayed in the circumferential direction of the stator core. Each of the segment set groups forms partial phase windings to which given phase voltages are applied, respectively. Each of the phase coils includes ones of the partial phase windings which are arrayed in the radius direction of the stator core and joined in series. The slots are broken down into same phase slot groups each of which has placed therein the conductor portions of the segments to which the same phase voltage is applied. The slots in each of the same phase slot groups is arrayed adjacent to each other in the circumferential direction of the stator core. The partial phase windings arrayed in the radius direction of the stator core within each of the slots of each of the same phase slot groups are joined in series to form a series-connected phase coil circuit The series-connected phase coil circuits placed respectively within the slots of each of the same phase slot groups are joined in parallel to form each of the phase coils.

According to the second aspect of the invention, there is provided a sequentially joined-segment stator coil for a rotary electrical machine which comprises: (a) a stator core having opposed ends and slots formed at given intervals in a circumferential direction of the stator core, each of the slots defining therein even segment-inserted positions which are aligned in a radius direction of the stator core; and (b) a plurality of segments placed in the slots of the stator core, the segments being joined in sequence to form turns of each of M (=an integer more than two) phase coils. Each of the segments includes a pair of conductor portions each of which is inserted into one of two of the slots spaced from each other at a given interval, a head portion extending from the pair of conductor portions outside one of the ends of the stator core to form a segment head-side coil end, and a pair of end portions each of which extends from one of the pair of conductor portions outside the other end of the stator core to form a segment end-side coil end. Each of the head portions is made up of a substantially U-shaped tip portion and a pair of slant portions which continue from ends of the head portion, slant to a circumferential and an axial direction of the stator core, and lead to the conductor portions, respectively. Each of the end portions is made up of slant end portions slanting from the two of the slots to the circumferential and axial directions and tips each of which continues from one of the slant end portions and is joined to one of the tips of the end portions of another of the segments. The segment head-side coil end includes a plurality of sets of the head portions arrayed in the radius direction of the stator core, as viewed in the circumferential direction of the stator core. The segment end-side coil end includes a plurality of sets of the end portions arrayed in the radius direction, as viewed in the circumferential direction of the stator core.

Each of the tip portions of the head portions of the segments bulges more than a corresponding one of the pairs of conductor portions in the radius direction of the stator core. A radius-wise pitch between two of the tip portions adjacent to each other in the radius direction is smaller than a width of the tip portions in the radius direction. Sections of the tip portions having a maximum width in the radius direction of the stator core are shifted in location from each other in the axial direction of the stator core.

Specifically, the bulges of the tip portions of the segments are shifted in the axial direction of the stator core, that is, the lengthwise direction of the segments, thereby eliminating physical interference between adjacent two of the bulges, which results in a decrease in pitch between the conductor portions placed within each of the slots.

Each of the segments, like the above, may be viewed as the segment set.

In the preferred mode of the invention, two of the tip portions of the head portions arrayed adjacent to each other in the radius direction of the stator core are shifted from each other in the axial direction of the stator core a distance longer than a length of the tip portions in the axial direction of the stator core.

The segments are broken down into a plurality of segment sets each made up of a small-sized segment with a small head and a large-sized segment with a large head extending over the small head of the small-sized segment in the circumferential direction of the stator core. The segment sets are broken down into a plurality of segment set groups arrayed in the radius direction of the stator core. The segment sets in each of the segment set groups are arrayed in the circumferential direction of the stator core. Each of the segment set groups forms partial phase windings to which given phase voltages are applied, respectively. Each of the phase coils includes ones of the partial phase windings which are arrayed in the radius direction of the stator core and joined in series.

The slots are broken down into same phase slot groups each of which has placed therein the conductor portions of the segments to which the same phase voltage is applied. The slots in each of the same phase slot groups are arrayed adjacent to each other in the circumferential direction of the stator core. The partial phase windings arrayed in the radius direction of the stator core within each of the slots of each of the same phase slot groups are joined in series to form a series-connected phase coil circuit. The series-connected phase coil circuits placed respectively within the slots of each of the same phase slot groups are joined in parallel to form each of the phase coils.

According to the third aspect of the invention, there is provided a sequentially joined-segment stator coil of a rotary electrical machine which comprises: (a) a stator core having opposed ends and slots formed at given intervals in a circumferential direction of the stator core, each of the slots defining therein even segment-inserted positions which are aligned in a radius direction of the stator core; and (b) a plurality of segments placed in the slots of the stator core, the segments being joined in sequence to form turns of each of M (=an integer more than two) phase coils. Each of the segments includes a pair of conductor portions each of which is inserted into one of two of the slots spaced from each other at a given interval, a head portion extending from the pair of conductor portions outside one of the ends of the stator core to form a segment head-side coil end, and a pair of end portions each of which extends from one of the pair of conductor portions outside the other end of the stator core to form a segment end-side coil end. Each of the head portions is made up of a substantially U-shaped tip portion and a pair of slant portions which continue from ends of the head portion, slant to a circumferential and an axial direction of the stator core, and lead to the conductor portions, respectively. Each of the end portions is made up of slant end portions slanting from the two of the slots to the circumferential and axial directions and tips each of which continues from one of the slant end portions and is joined to one of the tips of the end portions of another of the segments. The segment head-side coil end includes a plurality of sets of the head portions arrayed in the radius direction of the stator core, as viewed in the circumferential direction of the stator core. The segment end-side coil end includes a plurality of sets of the end portions arrayed in the radius direction, as viewed in the circumferential direction of the stator core.

Each of the tip portions of the head portions of the segments bulges more than a corresponding one of the pairs of conductor portions in the radius direction of the stator core. A radius-wise pitch between two of the tip portions adjacent to each other in the radius direction is smaller than a width of the tip portions in the radius direction. Sections of the tip portions having a maximum width in the radius direction of the stator core are shifted in location from each other in the circumferential direction of the stator core.

Specifically, the bulges of the tip portions of the segments are shifted in the circumferential direction of the stator core, that is, the widthwise direction of the segments, thereby eliminating physical interference between adjacent two of the bulges, which results in a decrease in pitch between the conductor portions placed within each of the slots.

Each of the segments, like the above, may be viewed as the segment set.

In the preferred mode of the invention, two of the tip portions of the head portions arrayed adjacent to each other in the radius direction of the stator core are shifted from each other in the circumferential direction of the stator core a distance longer than a length of the tip portions in the circumferential direction of the stator core.

The segments are broken down into a plurality of segment sets each made up of a small-sized segment with a small head and a large-sized segment with a large head extending over the small head of the small-sized segment in the circumferential direction of the stator core. The segment sets are broken down into a plurality of segment set groups arrayed in the radius direction of the stator core. The segment sets in each of the segment set groups are arrayed in the circumferential direction of the stator core. Each of the segment set groups forms partial phase windings to which given phase voltages are applied, respectively. Each of the phase coils includes ones of the partial phase windings which are arrayed in the radius direction of the stator core and joined in series.

The slots are broken down into same phase slot groups each of which has placed therein the conductor portions of the segments to which the same phase voltage is applied. The slots in each of the same phase slot groups are arrayed adjacent to each other in the circumferential direction of the stator core. The partial phase windings arrayed in the radius direction of the stator core within each of the slots of each of the same phase slot groups are joined in series to form a series-connected phase coil circuit. The series-connected phase coil circuits placed respectively within the slots of each of the same phase slot groups are joined in parallel to form each of the phase coils.

Typical sequentially joined-segment stator coils are usually employed as automotive ac generator, but however, now expected to be used for automotive high power drive motors to produce torque to drive an automobile. It is necessary to supply an extremely high voltage (e.g., a few hundred voltages) to such drive motors in order to compensate for a loss thereof caused by resistances of wiring and the stator coil. However, service speeds of the both are substantially identical, thus requiring the sequentially joined-segment stator coil for the automotive drive motor to have turns greater in number than the one for the automotive ac generator. The increase in turns may be, as shown in FIG. 16, by laying segments 33*a*, 33*b*, 33*c*, 33*d*, and 33*e* to overlap each other to increase conductor portions arrayed in the slot S in a radius direction of the stator core 1. This multi-lap segment structure, however, encounters drawbacks that types of segments needs to be increased with an increase in lap of the segments, and a head of an outermost one of the segments has a greater length, thus resulting in an increase in electrical resistance thereof.

Particularly, although not illustrated clearly in FIG. 16, the width of the tip H of each segment is commonly greater than that of legs L thereof for production reasons. This causes the width W of the segment head-side coil end 311 of the stator coil to be great and also the distance of the segment head-side coil end 311 projecting from an end of the stator core 1 to be great, thus resulting in an increase in overall size and weight of the stator coil.

Additionally, the multi-lap segment structure also has drawbacks in that the greater width of the tips H of the segments results in a great degree of rubbing thereof, and the clearance d between adjacent two of the legs H of the segments needs to be increased for avoiding the rubbing, which results in a decrease in space factor of the stator coil and that the laps of the segments lead to the deterioration in heat dissipation from the segment 33*a*.

In order to avoid the above problems, in the sequentially joined-segment stator coil, as described above, each set of the large-sized and small-sized segments has legs disposed, as shown in FIG. 3, in adjacent four of the slots arrayed in the radius direction of the stator core 1. The segment sets arrayed in the circumferential direction of the stator core 1 are joined in series to form each of the partial phase windings. The partial phase windings arrayed adjacent each other in the radius direction of the stator core 1 are joined in series to form each of the phase coils.

According to the fourth aspect of the invention, there is provided a production method of the sequentially joined-segment stator coil as described above. The method comprises: (a) preparing conductor segments each including a head and a pair of legs extending from ends of the head; (b) preparing a plurality of rings arrayed coaxially with each other to be rotatable relative to each other; (c) holding portions of the legs of each of the conductor segments in the rings, respectively, which make the conductor portions placed in the stator core; (d) leaning the heads of the conductor segments outwardly of the rings simultaneously; and (e) rotating the rings to spread end portions of each of the heads of the conductor segments to complete the slant portions of a corresponding one of the head portions of the segments.

In the preferred mode of the invention, the method further comprises preparing a head press member having formed therein a frusto-conical protrusion to define a tapered peripheral surface. The leaning of the heads of the conductor segments is achieved by moving the head press member toward the rings in an axial direction of the rings to press an inner one of the end portions of each of the heads of the conductor segments outwardly in the radius direction of the rings through the tapered peripheral surface.

The method further comprises a cylindrical stopper member working to stop the leaning of the heads of the conductor segments for avoiding an excessive inclination of the heads.

The conductor segments are broken down into a plurality of segment sets each made up of a small-sized conductor segment with a small head and a large-sized conductor segment with a large head extending over the small head of the small-sized conductor segment. The stopper member works to hold the small-sized head of each of the small-sized conductor segment from moving outside the large-sized head of the large-sized conductor segment in the radius direction of the rings.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
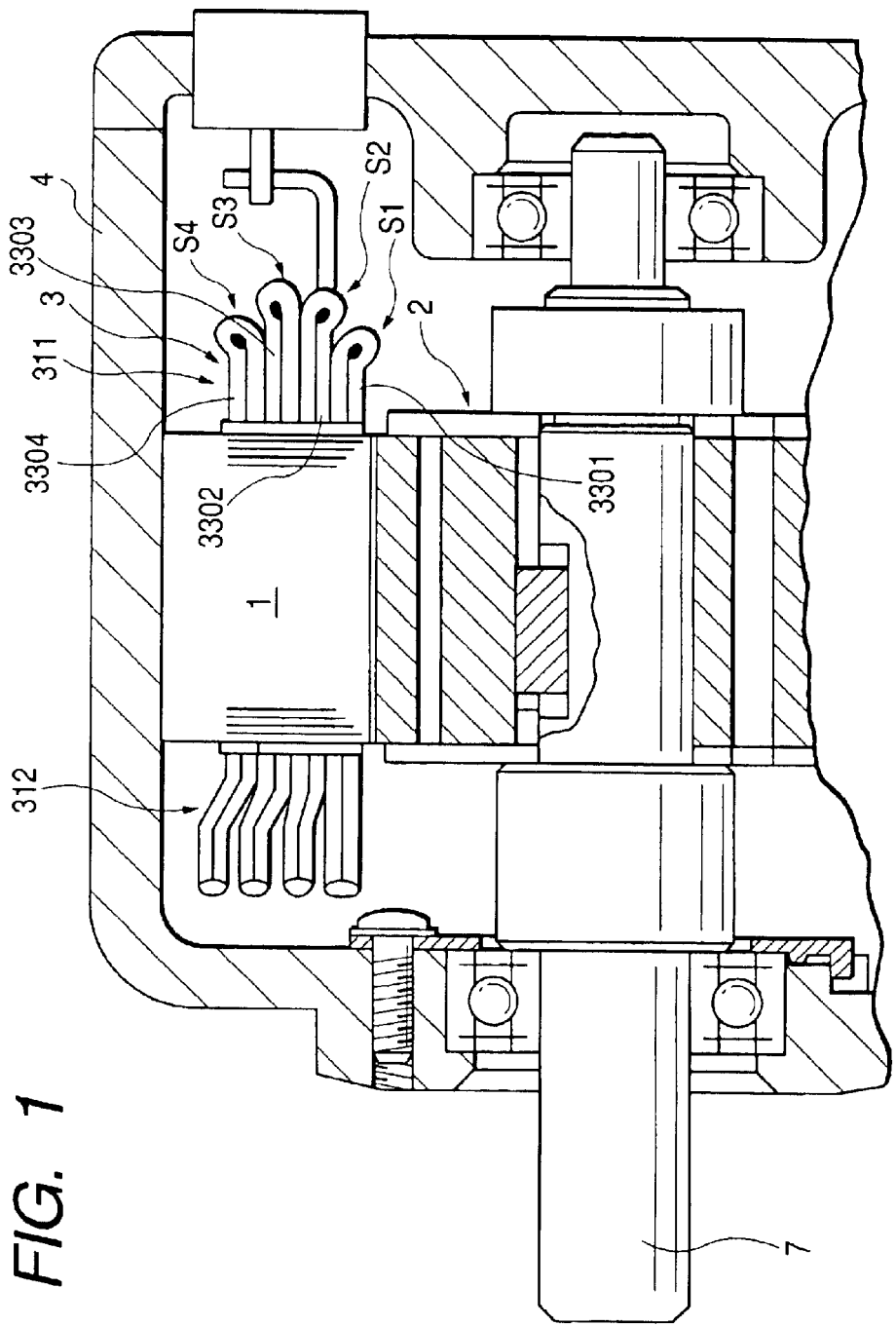
FIG. 1 is a partially longitudinal sectional view which shows a rotary electrical machine equipped with a stator coil according to the invention.

Referring to the drawings, wherein like reference numbers refer to like parts in several views, particularly to FIG. 1, there is shown a high-voltage rotary electrical machine for automotive vehicles according to the invention which is equipped with a sequentially joined-segment stator coil.

The rotary electrical machine may be used as a drive motor designed to produce power to drive an automotive vehicle such as an electric automobile. The rotary electrical machine consists essentially of a stator core 1, a rotor 2, a stator coil 3, a housing 4, and a rotary shaft 7. The stator core 1 is fixed to an inner peripheral wall of the housing 4. The stator coil 3 is wound in slots formed in the stator core 1. The rotor 2 is of an IPM type which is installed on the rotary shaft 7 supported rotatably by the housing 4 through bearings. The rotor 2 is disposed within the stator core 1. The stator coil 3 is implemented by a three-phase armature winding and supplied with power from a three-phase inverter leading to an external battery designed to develop approximately 300V.

The rotary electrical machine may be a permanent magnet three-phase brushless DC motor (synchronous motor) designed to produce drive power required to drive a storage battery-powered vehicle, a fuel cell-powered vehicle, or a hybrid vehicle. The rotor structure may be a variety of know structure, and explanation thereof in detail will be omitted here.

Figure 2:
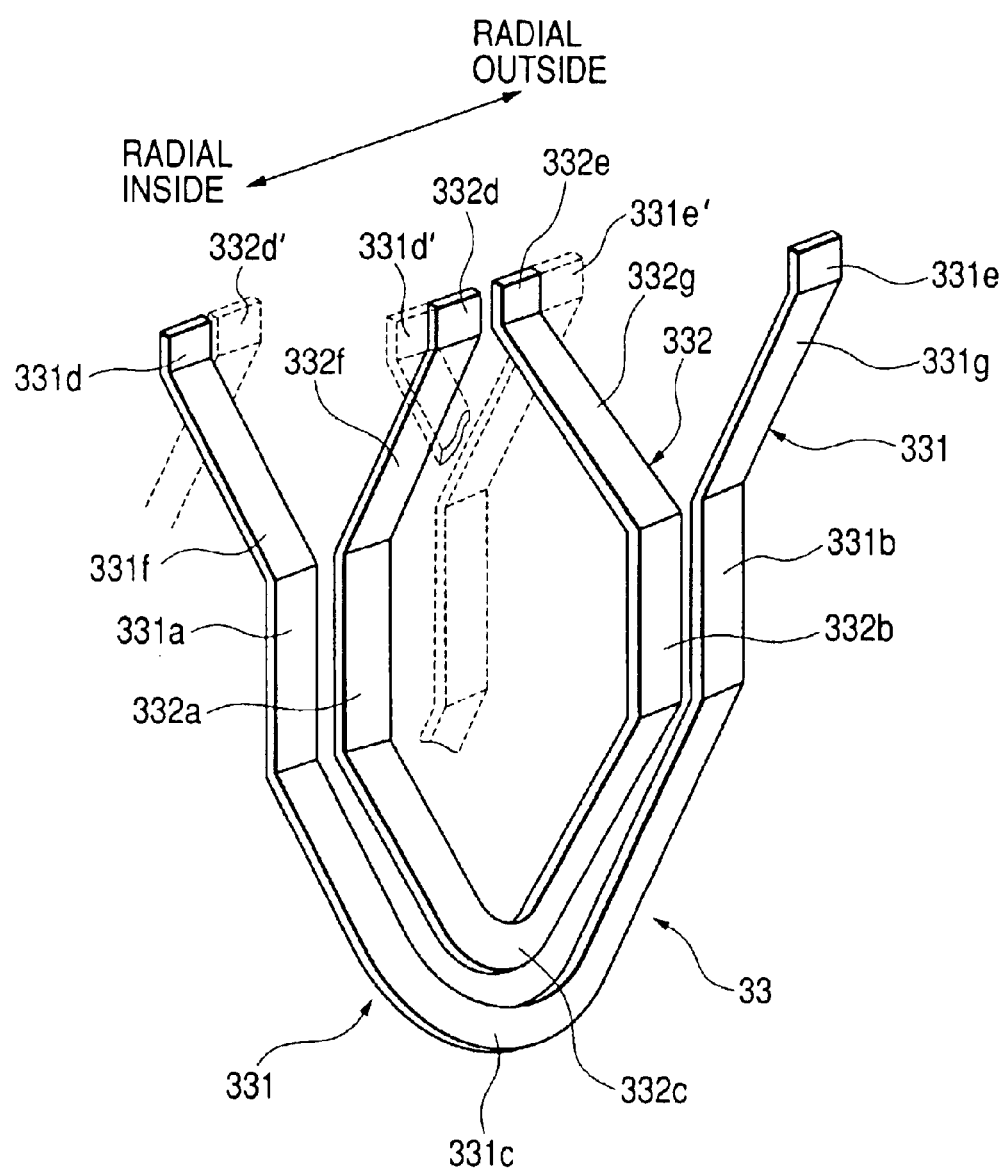
FIG. 2 is a perspective view of a set of a small-sized conductor segment and a large-sized conductor segment extending over the small-sized conductor segment of a stator coil.
Figure 3:
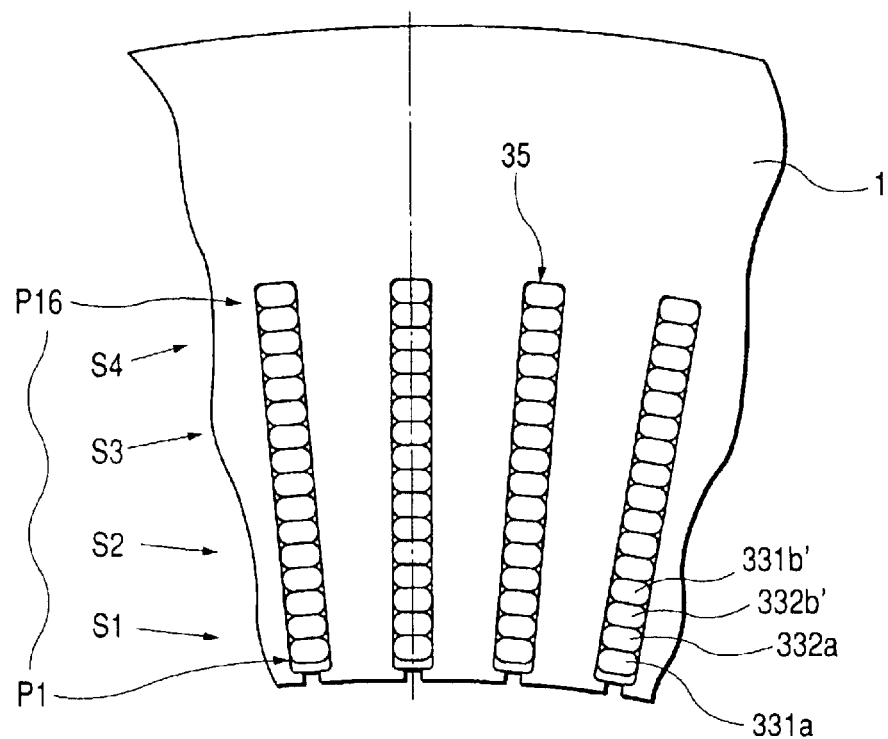
FIG. 3 is an enlarged partial view which shows arrays of conductor segments within slots of a stator core.

The stator coil 3 is made up of sequentially joined conductor segments 33, as shown in FIG. 2, placed within slots 35, as shown in FIG. 3, formed in the stator core 1. The conductor segments 33 are inserted into the slots 35 from one end of the stator core 1 to have legs thereof project from the other end of the stator core 1. The legs of the conductor segments 33 are twisted or expanded through an electrical angle $\pi/2$ in a circumferential direction of the stator core 1 and welded at ends thereof in a unit of a predetermined number of legs. The conductor segments 33 are covered with a resinous film except the welded ends and each made of a U-shaped strip. Such a stator coil structure is well known in, for example, U.S. Pat. Nos. 6,201,332 B1, 6,249,956 B1, and 6,404,091 B1, all assigned to the same assignee as that of this application, disclosure of which is incorporated therein by reference.

The conductor segments 33 are each made up of a U- or V-shaped head, a pair of side conductor portions extending straight from ends of the head which are to be inserted into the slots 35 (will also be referred to as slot-inserted portions below), and end portions which continue from the side conductor portions and project outside the slots 35 when the side conductor portions are placed within the slots 35. The conductor segments 33 are broken down into two types: a large-sized conductor segment 331 and a small-sized conductor segment 332 which will also be referred to as a segment set below. Each of the end portions projects from a front end of the stator core 1 and welded to one of the end portions 34 of another conductor segment 33 to form a segment end-side coil end 312, as illustrated in FIG. 1, which extends in the circumferential direction of the stator core 1 in the form of a ring. The head of each of the conductor segments 33 projects from a rear end of the stator core 1 to form a segment head-side coil end 311 which extends in the circumferential direction of the stator core 1 in the form of a ring.

As clearly shown in FIG. 1, four sets of the conductor segments 22 are placed within each of the slots 35 in alignment in a radius direction of the stator core 1. In the following discussion, groups, each of which is made up of sets of the conductor segments 33 arrayed in the circumferential direction thereof, will be designated at S1, S2, S3, and S4 from inside to outside of the stator core 1. Numeral 3301 indicates the heads of the conductor segments 33 in the innermost group S1, numeral 3302 indicates the heads of the conductor segments 33 in the second-innermost group S2, numeral 3303 indicates the heads of the conductor segments 33 in the third-innermost group S3, and numeral 3304 indicates the heads of the conductor segments 33 in the outermost group S4. The four groups S1 to S4 form the segment head-side coil end 311. In FIG. 1, only the eight end portions of the conductor segments 33 defining the segment end-side coil end 312 in two of the groups S1 to S4 (i.e., four pairs of the conductor segments 33) are shown for the brevity of illustration.

Each set of the conductor segments 33 is, as described above, made up of the large-sized conductor segment 331 and the small-sized conductor segment 332. The large-sized conductor segment 331, as can be seen in FIG. 2, surrounds or extends over the small-sized conductor segment 332.

The large-sized conductor segment 331 consists of the head portion 331c, the slot-inserted portions 331a and 331b, and the end portions 331f and 331g. The end portions 331f and 331g are welded at tips 331d and 331e which will also be referred to as welds below. An inner and an outer one of the slot-inserted portions 331a and 331b will also be referred to as an innermost and an outermost slot-inserted portions 331a and 331b, respectively.

The small-sized conductor segment 332 consists of the head portion 332c, the slot-inserted portions 332a and 332b, and the end portions 332f and 332g. The end portions 332f and 332g are welded at tips 332d and 332e which will also be referred to as welds below. An inner and an outer one of the slot-inserted portions 332a and 332b will also be referred to as a middle inside slot-inserted portion 332a and a middle outside slot-inserted portion 332b, respectively.

In FIG. 2, each reference number with a dash (') denotes the same portion as that referred to by a like reference number with no dash. In the illustrated example, the tips 331d and 332d' located adjacent each other in the radius direction of the stator core 1 are welded together. Similarly, the tips 332d and 331d' and the tips 332e and 331e' are welded together.

In the example as illustrated in FIG. 2, the innermost slot-inserted portion 331a and the outermost slot-inserted portion 331b of the conductor segment 331 are placed within ones of the slots 35 spaced from each other at odd magnetic pole pitches T (e.g., one magnetic pole pitch, as expressed in an electrical angle π). Similarly, the middle inside slot-inserted portion 332a and the middle outside slot-inserted portion 332b of the conductor segment 332 are placed within ones of the slots 35 spaced from each other at the same odd magnetic pole pitches as that of the conductor segment 331.

The head portion 332c of the small-sized conductor segment 332 is located inside the head portion 331c of the large-sized conductor segment 331.

The stator core 1 has, as clearly shown in FIG. 3, the slots 35 having a length extending in the radius direction thereof. Within each of the slots 35, sixteen of the slot-inserted portions of the conductor segments 33 are arrayed in line or aligned in the radius direction of the stator core 1. In the following discussion, the sixteen slot-inserted portions placed in each of the slots 35 will also be referred to as a first layer to a sixteenth layer, respectively, from inside to outside of the core 2. The locations of the first to sixteenth layers in each of the slots 35 will also be referred to below as a first layer position P1 to a sixteenth layer position P16, respectively. In each of the slots 35, the four segment set groups S1 to S4 are arrayed in sequence in the radius direction of the stator core 1. Specifically, the segment set group S1 occupies the first to fourth layer positions P1 to P4. The segment set group S2 occupies the fifth to eighth layer positions P5 to P8. The segment set group S3 occupies the ninth to twelfth layer positions P9 to P12. The segment set group S4 occupies the thirteenth to sixteenth layer positions P13 to P16.

Figure 4:
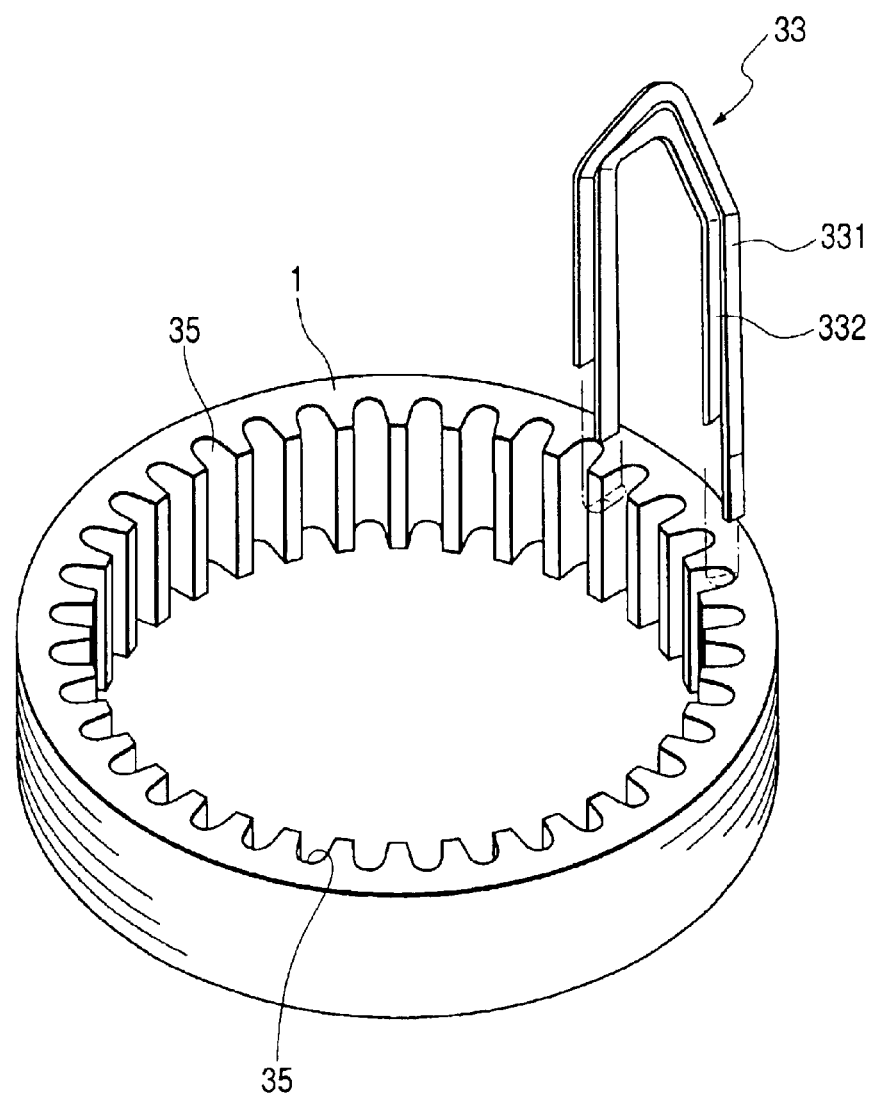
FIG. 4 is a perspective view which slows a set of a small-sized conductor segment and a large-sized conductor segment immediately before they are inserted into a stator coil.

In an individual segment set group, as for example, in the innermost segment set group S1, the innermost slot-inserted portion 331a of one of the conductor segments 331 is placed at the innermost position or the first layer position P1 within the slot 35. The middle inside slot-inserted portion 332a, the middle outside slot-inserted portion 332b', and the outermost slot-inserted portion 331b' are arrayed at the second, the third, and the fourth layer positions P2, P3, and P4, respectively. The middle outside slot-inserted portion 332b' and the outermost slot-inserted portion 331b', as described above, belong to the small-sized conductor segment 332 and the large-sized conductor segment 331 which are different from those of the middle outside slot-inserted portion 332b and the outermost slot-inserted portion 331b, respectively. The other segment set groups S2 to S4 are also placed in the slots 35 in the same manner as that of the segment set group S1, and explanation thereof in detail will be omitted here. FIG. 4 illustrates a set of the large-sized conductor segment 331 and the small-sized conductor segment 332 immediately before they are inserted into the slots 35 of the stator core 1.

Figure 9:
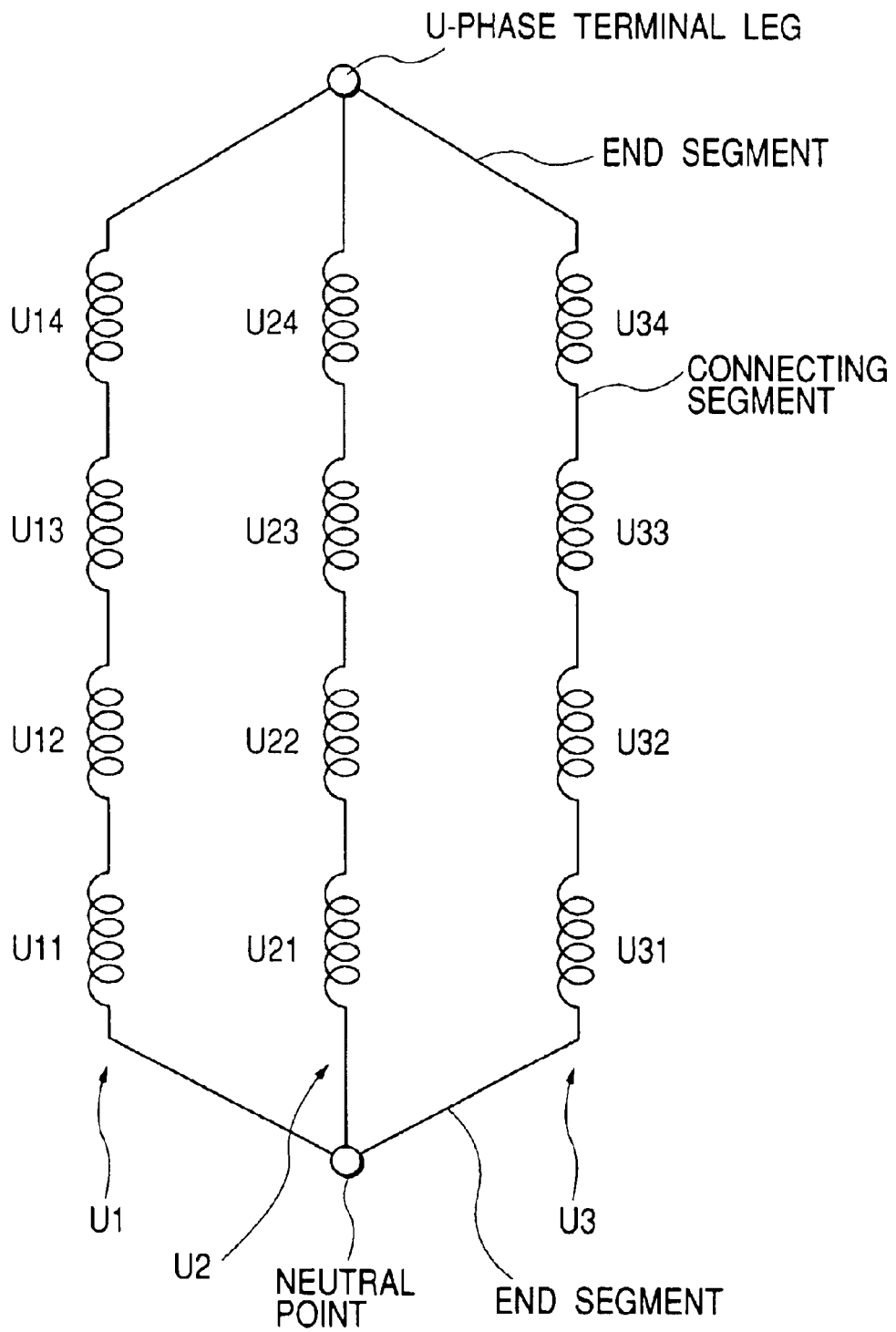
FIG. 9 is a circuit diagram which shows a U-phase winding of a stator coil of the invention.

The structure of the stator coil 3 made of three phase windings (will also be referred to as a U-phase coil, a V-phase coil, and a W-phase coil below) will be described below with reference to FIG. 9. The U-phase, V-phase, and W-phase coils are identical in structure, and the following discussion will refer to only the U-phase coil for the brevity of disclosure. FIG. 9 illustrates the U-phase coil made up of the segment set groups S1 to S4 arrayed in the radius direction of the stator core 1.

In this embodiment, the stator core 1 has a total of 108 slots 35 formed therein. Nine of the slots 35 are provided, three for each phase, within one magnetic pole pitch. The number of magnetic poles is twelve (12). Adjacent three of the slots 35 form a same-phase slot group within which the conductor segments 33 to which the same phase voltage is applied are placed. Within each of the slots 35, the sixteen layer positions P1 to P16 are, as described above, provided in sequence in the radius direction of the stator core 1.

The segment set group S1 occupies innermost four of the layer positions P1 to P16, i.e., the first to fourth layer positions P1 to P4 and forms three first partial phase coils for each phase. Specifically, in FIG. 9, the segment set group S1 forms first partial phase coils U11, U21, and U31. Each of the partial phase coils U11, U21, and U31 is placed in one of the three adjacent slots 35 of the same-phase slot group.

Similarly, the segment set group S2 which occupies the fifth to eighth layer positions P5 to P8 forms three second partial phase coils for each phase. Specifically, in FIG. 9, the segment set group S2 forms second partial phase coils U12, U22, and U32. Each of the partial phase coils U12, U22, and U32 is placed in one of the three adjacent slots 35 of the same-phase slot group.

The segment set group S3 which occupies the ninth to twelfth layer positions P9 to P12 forms three third partial phase coils for each phase. Specifically, in FIG. 9, the segment set group 33 forms third partial phase coils U13, U23, and U33. Each of the partial phase coils U13, U23, and U33 is placed in one of the three adjacent slots 35 of the same-phase slot group.

The segment set group S4 which occupies the thirteenth to sixteenth layer positions P13 to P16 forms three fourth partial phase coils for each phase. Specifically, in FIG. 9, the segment set group S4 forms fourth partial phase coils U14, U24, and U34. Each of the partial phase coils U14, U24, and U34 is placed in one of the three adjacent slots 35 of the same-phase slot group.

The partial phase coils U11, U12, U13, and U14 are placed in an outer one of the three adjacent slots 35 within the same-phase slot group. The partial phase coils U21, U22, U23, and U24 are placed in a middle one of the three adjacent slots 35 within the same-phase slot group. The partial phase coils U31, U32, U33, and U34 are placed in a remaining one of the three adjacent slots 35 within the same-phase slot group.

The partial phase coils U11, U12, U13, and U14 are joined in series to form a phase coil circuit U1. Similarly, the partial phase coils U21, U22, U23, and U24 are joined in series to form a phase coil circuit U2. The partial phase coils U31, U32, U33, and U34 are joined in series to form a phase coil circuit U3. A joint between adjacent two of the partial phase coils U11 to U34 within each of the slots 35 is achieved in a know manner using an anomalous conductor segment. For instance, a joint between the partial phase coils U12 and U13 may be achieved by drawing one of the conductor segments 33 (preferably, the large-sized conductor segment 331) of each of the partial phase coils U12 and U13 and inserting legs of a U-shaped conductor segment different in configuration from the conductor segments 33 into an unoccupied one of the slots 35 from which the conductor segment 33 of the partial phase coil U12 is drawn and an unoccupied one of the slots 35 from which the conductor segment 33 of the partial phase coil U13 is drawn. Similarly, a joint between the partial phase coils U11 and U12 may be achieved by drawing one of the conductor segments 33 of the partial phase coil U12 and inserting legs of a U-shaped conductor segment into the other of the unoccupied slots 35 of the partial phase coil U12 and an unoccupied one of the slots 35 from which the conductor segment 33 of the partial phase coil U11 is drawn.

In the other of the unoccupied slots 35 of the partial phase coil U12, a neutral point anomalous conductor segment (or a terminal leg) is inserted. Similarly, a terminal leg (or a neutral point anomalous conductor segment) is inserted into the other of the unoccupied slots 35 of the partial phase coil U14.

The phase coil circuits U1, U2, and U3 are connected electrically in parallel to complete the U-phase coil.

A standard production process of typical sequentially joined-segment stator coils will first be described below prior to describing features of the invention.

Head Twisting Process

First, a required number of two types of pine needle-like conductor segments are prepared: one is to make the large-sized conductor segments 332, and the other is to make the small-sized conductor segments 331. Each of the pine needle-like conductor segments is made up of a sharply curved head and a pair of straight legs extending in parallel.

Next, the pine needle-like conductor segments are machined to form U-shaped conductor segments. Legs of each of the U-shaped conductor segments are twisted or spread so that they are spaced from each other at a magnetic pole pitch. A required number of the U-shaped conductor segments are arrayed spatially in a circle so that they may be inserted into the slots 35 of the stator core 1 simultaneously. This step is achieved in a manner described below.

Figure 5:
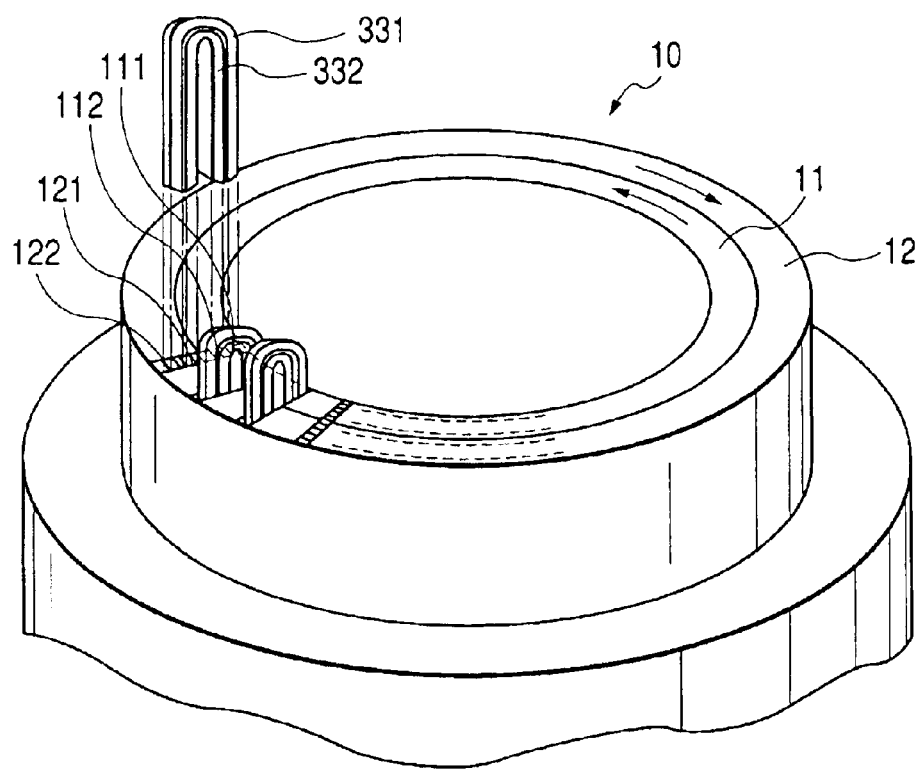
FIG. 5 is a perspective view which shows installation of a set of a small-sized conductor segment and a large-sized conductor segment within rings in a production process.

FIG. 5 shows a head twisting machine 10. The head twisting machine 10 includes a small ring 11 and a large ring 12 which are so installed on a base coaxially as to be rotatable relative to each other. The large ring 12 has pairs of holes 121 and 122 formed therein at a given interval in a circumferential direction thereof. The holes 121 and 122 of each pair are arrayed in a radius direction of the large ring 12. Similarly, the small ring 11 has pairs of the holes 11 and 112 formed therein at substantially the same interval as that of the pairs of the holes 121 and 122 in the circumferential direction thereof. The holes 111 and 112 are arrayed in the radius direction of the small ring 11. The hoes 111, 112, 121, and 122 are aligned in the radius direction of the rings 11 and 12. The U-shaped conductor segments for the large-sized conductor segments 331 are inserted at legs thereof into the innermost hole 111 and the outermost hole 112, while the U-shaped conductor segments for the small-sized conductor segments 332 are inserted at legs into the holes 112 and 121 located between the innermost and outermost holes 111 and 122. In the following discussion, the U-shaped conductor segments for making the large-sized conductor segments 331 and the small-sized conductor segments 332 will also be referred to as the large-sized and small-sized conductor segments 331 and 332 below for convenience.

Figure 6:
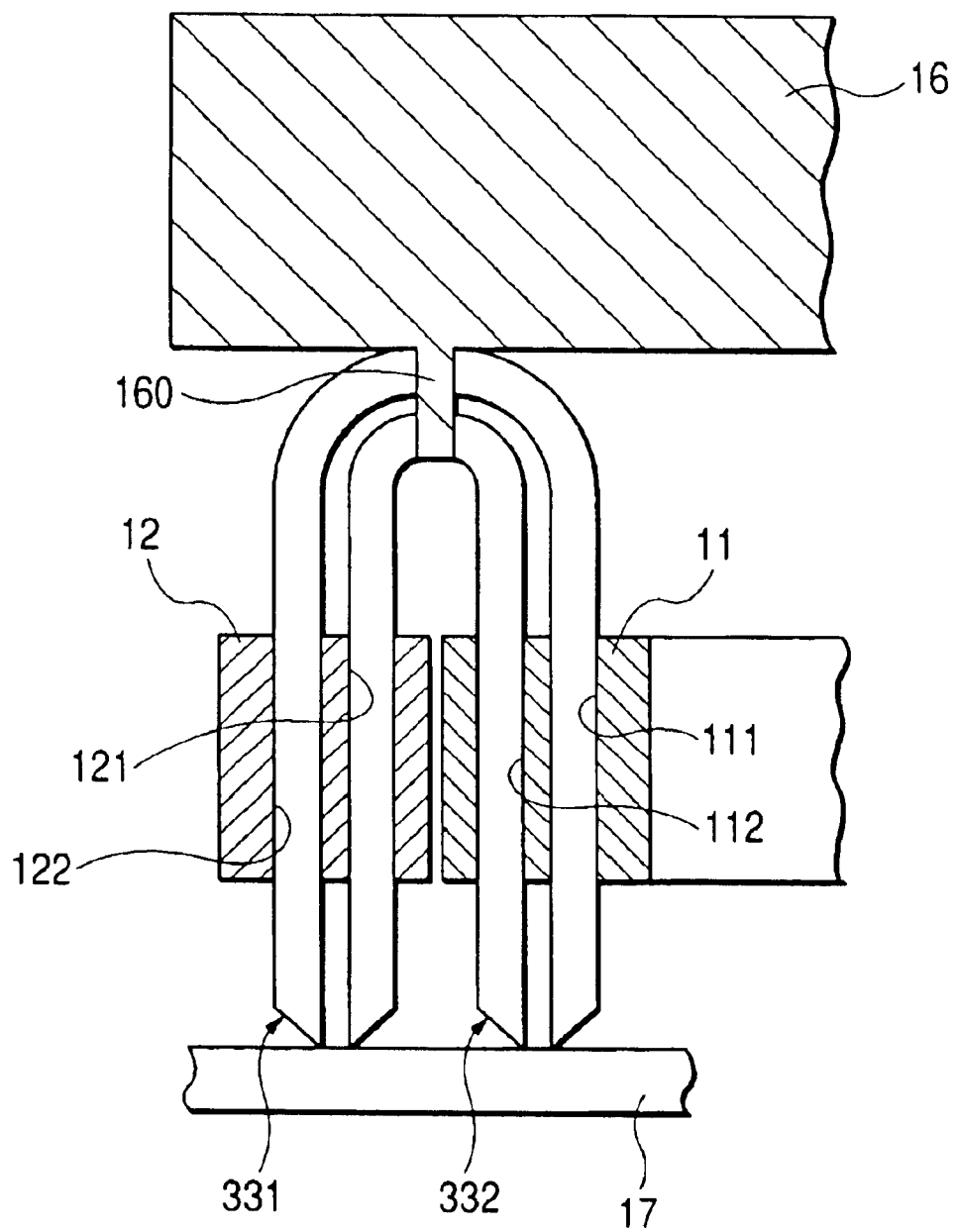
FIG. 6 is a partially sectional view which shows a pair of tines used to catch heads of a set of a small-sized conductor segment and a large-sized conductor segment when legs of the conductor segments are spread by rotating rings in opposite directions.

FIG. 6 is a partial sectional view which shows the large-sized conductor segments 331 and the small-sized conductor segments 332 inserted into the holes 111, 112, 121, and 122 of the small ring 11 and the large ring 12. A head press ring 16 is placed above the small and large rings 11 and 12 coaxially therewith. The head press ring 16 has installed on the bottom thereof pairs of tines 160 (only one is illustrated) each of which hold therein tips of the head portions of the large-sized conductor segment 331 and the small-sized conductor segment 332 arrayed at the same location in the circumferential direction of the rings 11 and 12. Specifically, after the large-sized and small-sized conductor segments 331 and 332 are placed in the holes 111, 112, 121, and 122, the head press plate 16 is moved downward to catch the tips of the large-sized and small-sized conductor segments 331 and 332 between the tines 160.

Subsequently, the small and large rings 11 and 12 are turned in opposite directions an angle equivalent to half a magnetic pitch relative to the head press plate 16, respectively, thereby spreading the legs of all the large-sized and small-sized conductor segments 331 and 332 to an angle equivalent to one magnetic pitch in the circumferential direction of the rings 11 and 12.

During the rotation of the rings 11 and 12, the heads of the large-sized and small-sized conductor segments 331 and 332 move downward toward the rings 11 and 12. The rotation of the rings 11 and 12 is, therefore, performed while shifting the head press plate 16 downward. A stopper plate 17 is disposed beneath the rings 11 and 12. The stopper plate 17 works to control dropping of the large-sized and small-sized conductor segments 331 and 332, Instead of the stopper plate 17, an outer stopper plate for outer two of the legs and an inner stopper plate for inner two of the legs may be used. In this case, the outer stopper plate is secured to the large ring 12 to be rotatable in unison. The inner stopper plate is secured to the small ring 11 to be rotatable in unison.

After completion of the twisting of the heads of the large-sized and small-sized conductive segments 331 and 332, the ring 11 and 12 are removed from the conductor segments 331 and 332 while holding the conductor segments 331 and 332 through the head press plate 16.

Insertion of End of Conductor Segment to Slot

The small-sized conductor segments 332 are removed from the rings 11 and 12 and inserted into, as shown in FIG. 4, the middle inside layer position and the middle outside layer position of the slots 35 of the stator core 1. Similarly, the large-sized conductor segments 331 are removed from the rings 11 and 12 and inserted into the outermost layer position and the innermost layer position of the slots 35. The head press plate 16 may be used to hold the large-sized and small-sized conductor segments 331 and 332 upon insertion to the slots 35, thereby enabling the conductor segments 331 and 332 to be fitted in the slots 35 simultaneously. After completion of the insertion, the head press plate 16 is removed from the conductor segments 331 and 332.

The formation of the large-sized and small-sized conductor segments 331 and 332 and insertion thereof into the slots 35 are not limited to the above described steps and alternatively achieved in other known steps.

End Twisting Process (End Spreading Process)

In an end twisting process as discussed below, the end portion 331g continuing from the outermost slot-inserted portion 331b and the end portion 331f continuing from the innermost slot-inserted portion 331a of the large-sized conductor segment 331 are spread in opposite directions. The end portion 332f continuing from the middle inside slot-inserted portion 332b and the end portion 332g continuing from the middle outside slot-inserted portion 332b of the small-sized conductor segment 332 are spread in opposite directions. An angular interval between the slot-inserted portions 311f and 332f is equivalent to one magnetic pole pitch. Similarly, an angular interval between the slot-inserted portions 331g and 332g is equivalent to one magnetic pole pitch.

Figure 7:
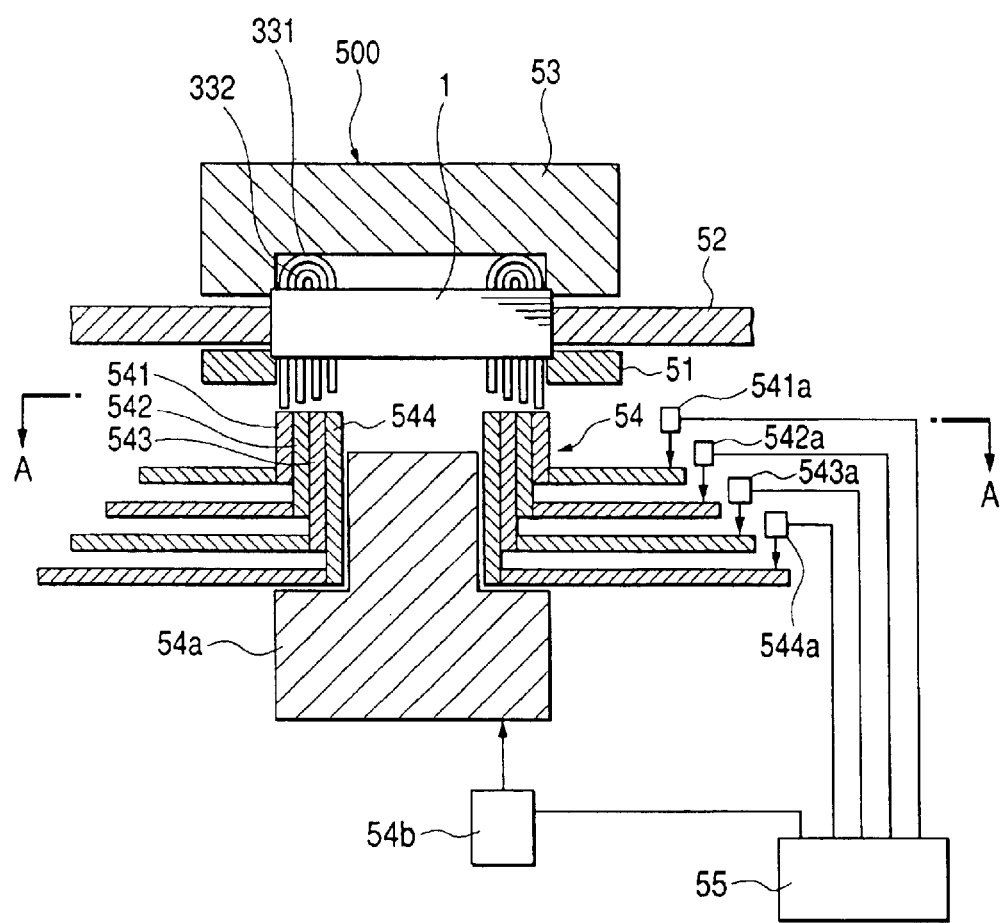
FIG. 7 is a vertical sectional view which shows a stator coil twisting machine.
Figure 8:
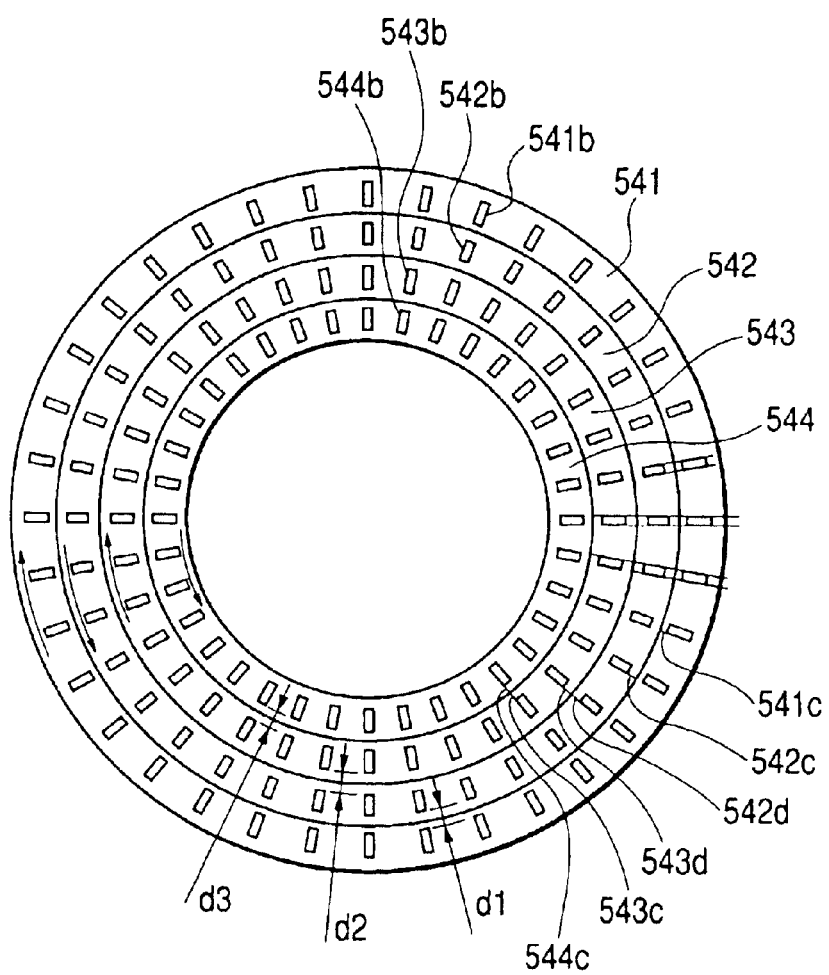
FIG. 8 is a plane view, as taken along the line A—A in FIG. 7, which shows rings of the stator coil twisting machine.

The end twisting process will be described with reference to FIGS. 7 and 8. FIG. 7 is a vertical sectional view which shows a stator coil twisting machine 500. FIG. 8 is a sectional view as taken along the line A—A in FIG. 7.

The stator coil twisting machine 500 consists of a work mount 51, a clamper 52, a work press 53, a twister 54, a lifting shaft 54a, rotary drive mechanisms 541a to 544a, a lifting mechanism 54b, and a controller 55. The work mount 51 is designed to hold the periphery of the stator core 1. The clamper 52 works to control radial movement of the stator core 1 and hold it. The work press 53 works to hold the stator core 1 from moving vertically. The twister 54 works to twist the end portions of the conductor segments 33 (i.e., the large-sized and small-sized conductor segments 331 and 332) projecting outside the stator core 1. The lifting shaft 54a works to move the twister 54 vertically. The rotary drive mechanisms 541a to 544a work to rotate the twister 54 in the circumferential direction of the stator core 1. The lifting mechanism 54b works to move the lifting shaft 54a vertically. The controller 55 works to control operations of the rotary drive mechanisms 541a to 544a and the lifting mechanism 54b.

The twister 54 is made up of four hollow cylinders 541 to 544 arrayed coaxially. The cylinders 541 to 544 are coupled to the rotary drive mechanisms 541a to 544a, respectively, so that they may be turned independently. The cylinders 541 to 544 are moved vertically by the lifting mechanism 54b through the lifting shaft 54a. This vertical movement may be achieved simultaneously with the rotation of the cylinders 541 to 544.

The cylinders 541 to 544 each have, as clearly shown in FIG. 8, segment end holding bores 541b to 544b formed in upper surfaces thereof into which tips of the end portions 331f, 331g, 332f, and 332g of the conductor segments 33 are to be inserted, The segment end holding bores 541b to 544b are identical in number with the slots 35 of the stator core 1 and arrayed at a given interval in the circumferential direction of the cylinders 541 to 544.

Partition walls 541c to 544c, 542d, and 543d are, as shown in FIG. 8, formed in order to avoid communication among the bores 541b to 544b arrayed adjacent in the radius direction of the cylinders 541 to 544. The thickness of the partition walls 541c to 544c, 542d, and 543d are so selected that the interval d2 between the partition walls 542d and 543d of middle two of the cylinders 541 to 544 may be greater than the interval d1 between the partition walls 541c and 542c of outer two of the cylinders 541 to 544 and the interval d3 between the partition walls 543c and 544c of inner two of the cylinders 541 to 544.

In operation, the stator core 1 within which the conductor segments 33 are fitted is first mounted on the work mount 51. Next, the periphery of the stator core 1 is clamped by the clamper 52. Subsequently, the work press 53 is placed on the stator core 53 in abutment to an upper surface of the stator core 1 and head portions 331c of the large-sized conductor segments 331 to hold the stator core 1 and the conductor segments 33 from moving vertically.

After the stator core 1 is fixed by the clamper 52 and the work mount 53, the twister 54 is lifted up through the lifting shaft 54a to insert the end portions 331f, 331g, 332f, and 332g of the conductor segments 33 into the bores 541b to 544b of the cylinders 541 to 544.

The bores 541b to 544b are so formed as to receive only the tips of the end portions 331f, 331g, 332f, and 332g of the conductor segments 33 to be welded in a following process. The end portions 331f, 331g, 332f, and 332g are tapered in order to facilitate ease of insertion to the bores 541b to 544b.

After the end portions 331f, 331g, 332f, and 332g of the conductor segments 33 are inserted into the bores 541b to 544b of the twister 54, the twister 54 is turned and moved vertically by the rotary drive mechanisms 541a to 544a and the lifting mechanism 54b.

The rotation of the twister 54 is accomplished by turning the cylinders 541 and 543 a first angle in a clockwise direction and the cylinders 542 and 544 a second angle in a counterclockwise direction. The first and second angles may not be identical in absolute value with each other as long as the sum of absolute values of the first and second angles agrees with desired pitches between the slots 35.

Subsequently, the controller 55 controls the lifting mechanism 54b and the rotary drive mechanisms 541a to 544a and lifts up the twister 54 while rotating it so as to keep the length of the end portions 331f, 331g, 332f, and 332g of the conductor segments 33 between outlets of the slots 35 and inlets of the bores 541b to 544b of the twister 54 constant. The lifting of the twister 54 is preferably achieved so as to have the end portions 331f, 331g, 332f, and 332g of the conductor segments 33 follow an arc-shaped locus. Such twisting along the arc-shaped locus preferably continues until an angle of the twisting exceeds half a magnetic pole pitch (T/2) by a given value in order to avoid unwanted deformation of the conductor segments 33 arising from the spring back.

Afterwards, the rotary drive mechanisms 541a to 544a are turned in a direction reverse to that of the above step while moving the lifting mechanism 54b downward to terminate the twisting process of the conductor segments 33. The twister 54 is moved downward to remove the end portions 331f, 331g, 332f, and 332g of the conductor segments 33 from the bores 541b to 544b of the cylinders 541 to 544. Subsequently, the twister 54 is rotated by the rotary drive mechanisms 541a to 544a and returned back to an initial position. Finally, the clamper 52 and the work press 53 are removed from the stator core 1. The stator core 1 within which the twisted conductor segments 33 are fitted is taken out of the stator coil twisting machine 500.

As apparent from the above discussion, the twisting process includes the steps of spreading or bending the ends of the conductor segments 33 only in the circumferential directions of the stator core 1, pressing the ends of the conductor segments 33 both in the circumferential directions and vertical direction of the stator core 1 to bend them greatly, pressing the ends of the conductor segments 33 further both in the circumferential directions and the vertical direction to compensate for the spring back, and returning the ends of the conductor segments 33 back to a desired angle.

The twister 54 is designed to move in the axial direction of the stator core 1 as well as in the circumferential direction thereof, thereby making it possible to twist or bend the end portions 331f, 331g, 332f, and 332g of the conductor segments 33 along the arc-shaped locus so as to keep constant the length of the end portions 331f, 331g, 332f, and 332g of the conductor segments 33 between the outlets of the slots 35 and the inlets of the bores 541b to 544b of the twister 54, that is, the length of the end portions 331f, 331g, 332f, and 332g minus the length of the tips 331d, 331e, 332d, and 332e to be welded. This avoids dislodgement of the conductor segments 33 from the bores 541b to 544b of the cylinders 541 to 544.

Moreover, only the tips 331d, 331e, 332d, and 332e of the conductor segments 33 are inserted into the bores 431b to 544b, thereby facilitating the avoidance of the dislodgement of the conductor segments 33 from the bores 5411b to 544b.

Welding Process

This process is substantially the same as a conventional one.

Specifically, after completion of the above twisting process, the tips of the conductor segments 33 located at the first and second layer positions in each of the slots 35 are, as shown in FIGS. 1 and 2, joined by, for example, arc welding. Similarly, the tips of the conductor segments 33 located at the third and fourth layer positions are welded. This completes the stator coil 3.

Configuration of Segment Head-Side Coil End that is Feature of the Invention

Figure 10:
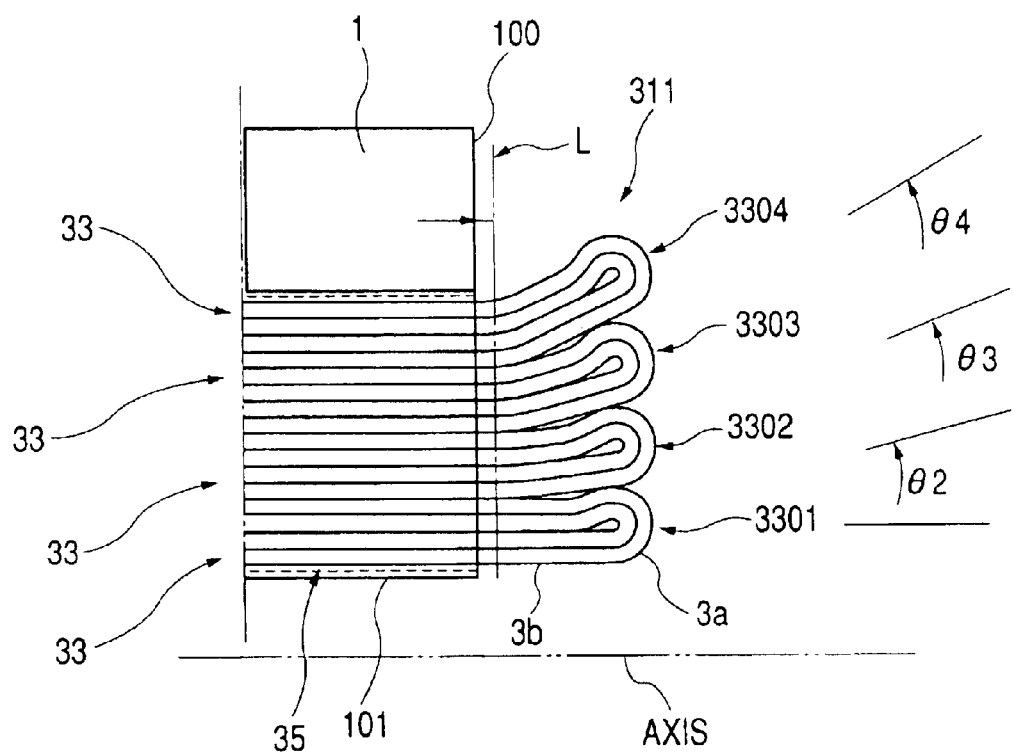
FIG. 10 is a partial sectional view taken in a radius direction of a stator core which shows a configuration of a segment head-side coil end according to the invention.

FIG. 10 is a partial sectional view taken in the radius direction of the stator core 1.

The stator core has the end surface 100 and the inner peripheral surface 101. The four segment sets 33 are arrayed within the slots 35 in sequence in the radius direction of the stator core 1, as viewed from the circumferential direction of the stator core 1. Sixteen straight portions of the four segment sets 33 are shown as being inserted into the same slot 35 for the brevity of illustration. In practice, as described already with reference to FIG. 2, the paired straight portions of each of the large-sized and small-sized conductor segments 331 and 332, for example, the slot-inserted portions 331a and 331b are disposed within two of the slots 35 located at an interval of electrical angle π away from each other. The same is true for FIGS. 11 and 12 as will be referred to later.

Numeral 3301 indicates a head portion of an innermost one of the segment sets 33. Numeral 3302 indicates a head portion of the second innermost one of the segment sets 33. Numeral 3303 indicates a head portion of the third innermost one of the segment sets 33. Numeral 3304 indicates a head portion of an outermost one of the segment sets 33. The head portions of the segment sets 3301 to 3304 form the segment head-side coil end 311.

The innermost head portion 3301 extends, like a conventional one, substantially in the axial direction of the stator core 1 (i.e., in parallel to a center line of the stator core 1). The head portions 3302, 3303, and 3304 are bent from potions thereof defined at a distance L from the end surface 100 of the stator core 1 at angles θ2, θ3, and θ4 to longitudinal center lines of the segment sets 33 upward, as viewed in the drawing, respectively. The angle θ2 is smaller than the angle θ3. The angle θ3 is smaller than the angle θ4. The head portion 3301 is shorter than the head portion 3302. The head portion 3302 is shorter than the head portion 3302. The head portion 3303 is shorter than the head portion 3304. Distances between ends of the head portions 3301 to 3304 and the end space 100 of the stator core 1 extending in parallel to the axis of the stator core 1 are substantially the same.

Each of the head portions 3301 to 3304 of the segment sets 33 is made up of a tip portion 3a and a slant portion 3b extending from the tip portion 3a toward the end surface 100 at a given tilt angle. The tip portion 3a, as referred to herein, represents a combination of tips of the large-sized and small-sized conductor segments 331 and 332. The slant portion 3b represents a combination of four straight portions of each set of the large-sized and small-sized conductor segments 331 and 332 which extend outside the end surface 100 of the stator core 1.

Specifically, the tip portion 3a is made up of a lap of the tips of the small-sized conductor segment 332 and the large-sized conductor segment 331 extending cover the small-sized conductor segment 332 in the radius direction of the stator core 1. The slant portion 3b extends straight, as viewed in FIG. 10, from the tip portion 3a toward the end surface 100 of the stator core 1.

The tip portion 3a of each of the head portions 3301 to 3304 bulges in a direction (i.e., the radius direction of the stator core 1 in a case of the head portion 3301), in which the head potions of the large-sized and small-sized conductor segments 331 and 332 lap, perpendicular to a direction in which the slant portion 3b extends (i.e., the radius direction of the stator core 1 in a case of the head portion 3301). The lap of the bulges of the head portions 3301 to 3304 in a direction parallel to the end surface 100 of the stator core 1 is established by bending the slant portions 3b at the angles θ2, θ3, and θ4. This eliminates the need for increasing the length of the slots 35 in the radius direction of the stator core 1.

The radius-wise pitch between two of the tip portions 3a adjacent to each other in the radius direction of the stator core 1 is preferably greater than a width of the tip portions 3a in the radius direction. The radius-wise pitch between the slant portions 3b of two of the head portions 3301 to 3304 arrayed adjacent to each other in the radius direction of the stator core 1 is preferably smaller than the width of the tip portions 3a in the radius direction.

The above structure permits a desired number of turns of the stator coil 3 to be installed within the housing 4 without increasing the diameter of the stator core 1, and avoids the deterioration in electrical insulation of the stator coil 3 arising from rubbing of the tip portions 3*a* of the segment head-side coil end 311. The distance L is provided for minimizing friction between the end surface 100 of the stator core 1 and the slant portions 3*b* of the segment set 33.

Figure 11:
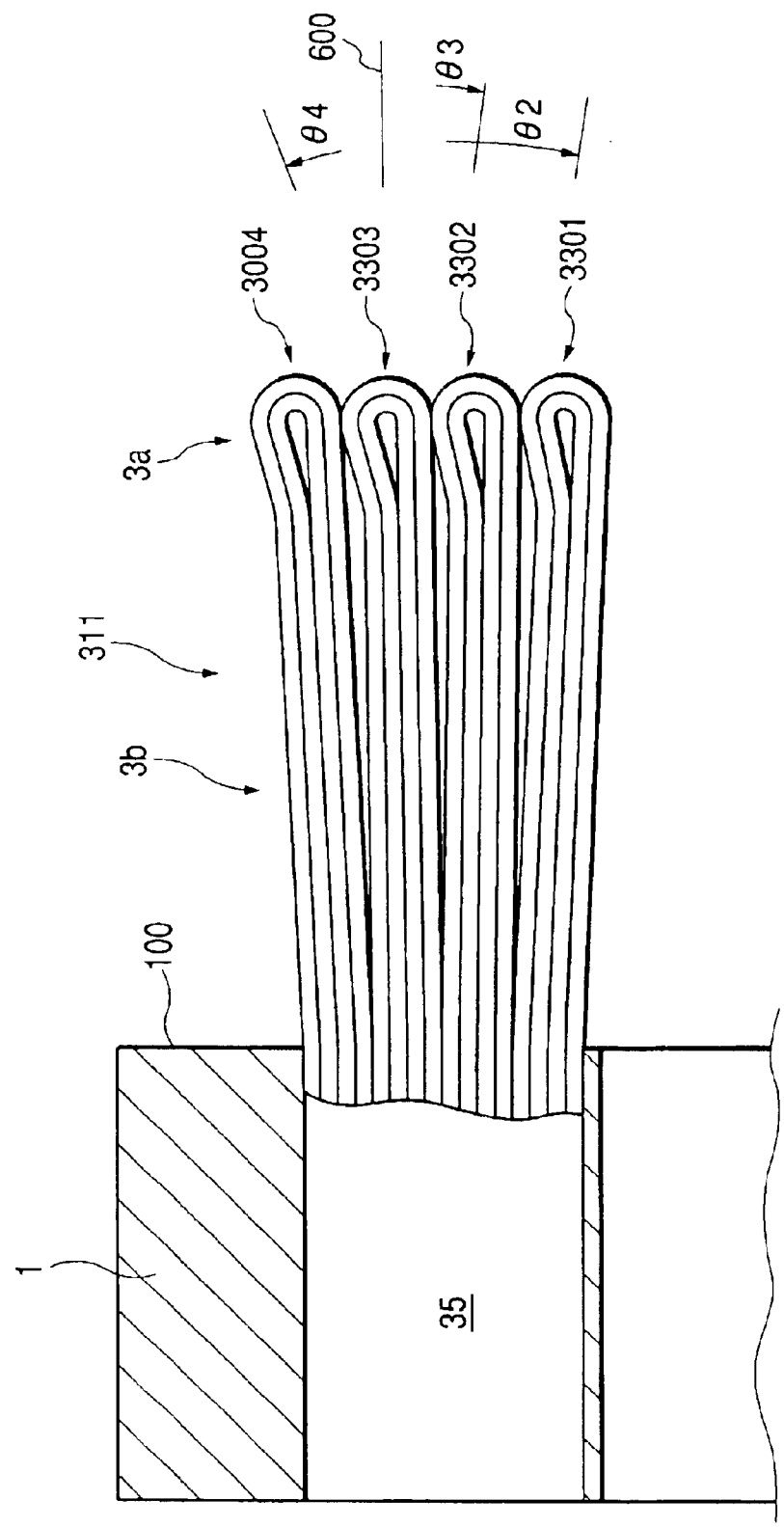
FIG. 11 is a partial sectional view taken in a radius direction of a stator core which shows the first modification of configuration of a segment head-side coil end.

FIG. 11 shows the first modification of the segment head-side coil end 311.

The head portion 3303 extends straight along a line 600 extending in parallel to the axial direction of the stator core 1. In other words, the head portion 3303 extends perpendicular to the end surface 100 of the stator core 1. The head portions 3301 and 3302 extend in a downward direction, as viewed in the drawing, slightly. In other words, the head portions 3301 and 3302 slant slightly to the center of the stator core 1. The head portion 3304 extend outward of the stator core 1. The angle θ2 is greater than the angle θ3.

The head portions 3301 to 3304, as illustrated in FIGS. 10 and 11, may alternatively have the same overall length (i.e., an overall length of a portion of each segment projecting outside the end surface 100 of the stator core 1) and bent at angles θ2 to θ4 which increase in sequence without aligning the tips of the head portions 3301 to 3304 in the radius direction of the stator core 1. This eliminates a variation in wiring length among the head portions 3301 to 3304, resulting in a decrease in resistance loss of the segment head-side coil end 311, improves the cooling capability, and decreases the number of types of conductor segments to be used.

Figure 12:
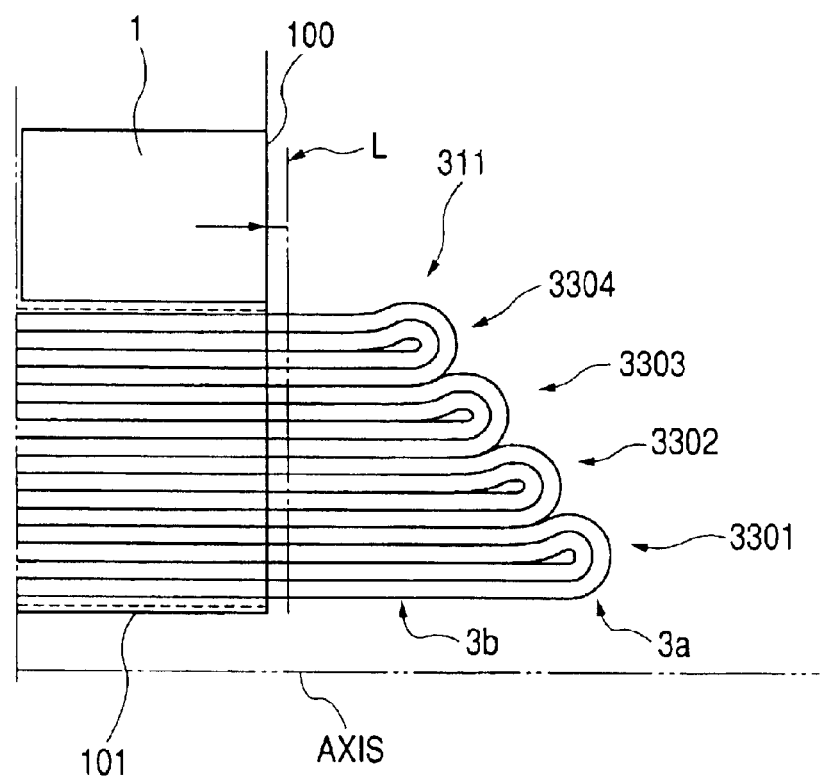
FIG. 12 is a partial sectional view taken in a radius direction of a stator core which shows the second modification of a segment head-side stator coil.

FIG. 12 shows the second modification of the segment head-side stator coil 311. The head portions 3301 to 3304 extend in parallel to the axis of the stator core 1 or straight from the slot-inserted portions of the conductor segments 33 thereof and have different lengths between the end surface 100 of the stator core 1 and the tips thereof which, as can be seen from the drawing, increase from the head portions 3301 to 3304 so as to shift the bulges thereof in the axial direction of the stator core 1. Specifically, the bulges of the tip portion 3*a* of the head portions 3301 to 3304 are laid so as not to lap over one another in the radius direction of the stator core 1. This minimizes the width of the segment head-side coil end 311, that is, a total distance between the outermost head portion 3304 and the innermost head portion 3301 in the radius direction of the stator core 1.

The slanting lap of the bulges of the tip portions 3*a* of the head portions 3301 to 3304 in this modification is achieved by decreasing the lengths of the head portions 3301 to 3304 in sequence by a length of the tip portions 3*a* extending in the axial direction of the stator core 1.

The segment head-side coil end 311 may also be formed with both the bending angle adjustment, as illustrated in FIG. 10, and the length coordination, as illustrated in FIG. 11.

FIG. 1 shows the third modification of the segment head-side coil end 311. The head portions 3301 to 3304 extend straight in the axial direction of the stator core 1. Outer two of the head portions 3301 to 3304, that is, the head portions 3301 and 3304 have the same length. Middle two of the head portions 3301 to 3304, that is, the head portions 3302 and 3303 has the same length. The head portions 3301 and 3304 are shorter than the head portions 3302 and 3303 by the length of the tip portion 3*a* extending in the axial direction of the stator core 1.

The bulges of the tip portions 3*a* of the head portions 3301 and 3302 are oriented inwardly of the stator core 1, while the bulges of the head portions 3303 and 3304 are oriented outwardly of the stator core 1. This permits the slant portions 3*b* of the head portions 3301 to 3304 to be arrayed in the radius direction of the stator core 1 at minimum intervals without lapping the bulges over one another in the radius direction of the stator core 1.

While in the above modification, the bulges of the outer head portions 3301 and 3304 are shifted to the stator core 1 from those of the inner head portions 3302 and 3303 in the axial direction of the stator core 1, they may alternatively be shifted in the circumferential direction of the stator core 1.

The shifting of the tip portions 3*a* in the circumferential direction of the stator core 1., which are arrayed adjacent to each other in the radius direction of the stator core 1, may be achieved by differentiating distances between ends of the slant portions 3*b* entering the slots 35 and opposite ends thereof leading to the tip portions 3*a* in the circumferential direction of the stator core 1. This may be accomplished by differentiating angles through which the rings 11 and 12 are rotated in the above described head twisting process. The total angle of rotation of the rings 11 and 12 is set to one magnetic pole pitch.

While in the above modifications, each of the slant portions 3*b* extends in the axial direction of the stator core 1 or inclines at a constant angle in the radius direction of the stator core 1, the slant portions 3*a* may be bent stepwise or curved with a curvature increasing at a variable rate outwardly of the stator core 1. In other words, a pitch between adjacent two of the slant portions 3*a* in the radius direction of the stator core 1 may be increased as getting away from the end surface 100 of the stator core in the axial direction thereof. The slant portions 3*a* may alternatively be bent from a central portion thereof at a given angle. All or only some of the slant portions 3*a* may be curved or bent in the radius direction of the stator core 1.

Head Bending Process that is Feature of the Invention

Figure 13:
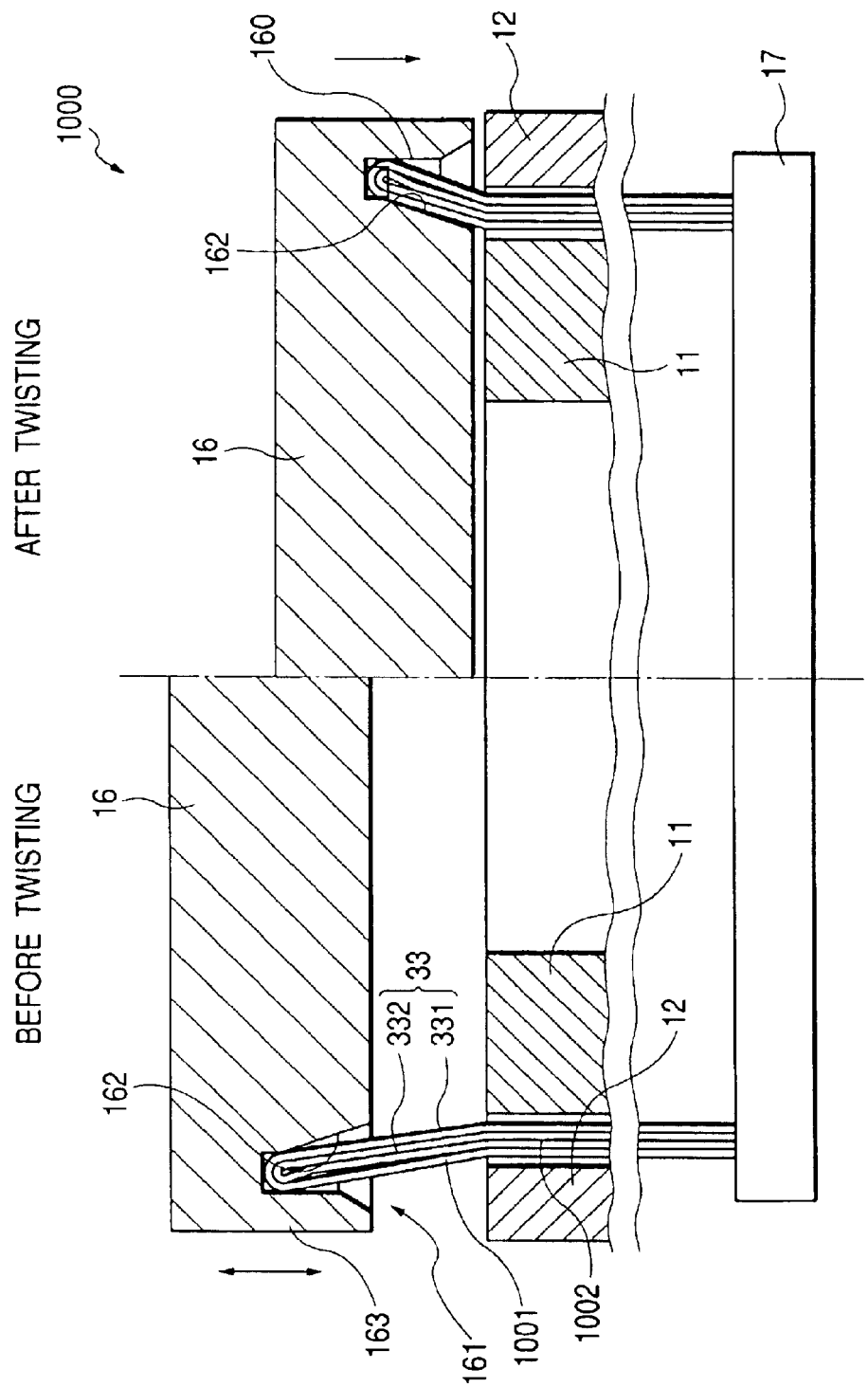
FIG. 13 is a vertical sectional view which shows a head twisting machine which works to twist a head of each conductor segment to produce a desired configuration of the head according to the invention.

A head bending process will be described below with reference to FIG. 13 which is performed concurrently with the head twisting process as described above using the same machine, but either of them may alternatively be performed early.

Numeral 1000 indicates a head twisting machine which is different in structure from the one illustrated in FIGS. 5 and 6 only in configuration of the head press plate 16. Other arrangements are identical, and explanation thereof in detail will be omitted here.

The head press plate 16 has formed therein an annular groove 161 within which a head of each of the segment set 33 consisting of the large-sized conductor segment 331 and the small-sized conductor segment 332 is to be placed. The head press plate 16 has formed in a central portion thereof a frusto-conical protrusion which defines an inner tapered wall 162. Specifically, the annular groove 161 is defined by the inner tapered wall 162 and an outer cylindrical wall 163. The annular groove 161 has formed on the bottom thereof (i.e., an upper wall as viewed in FIG. 13) pairs of tines 160 identical with the ones of FIG. 6 which work to catch the head of the segment set 33, respectively.

In operation, each of the segment sets 33 is first bent at a given angle from a boundary between a head portion 1001 that is to be formed into the part of the segment head-side coil end 311 and a straight portion 1002 that is to be formed into the slot-inserted portions 331*a*, 332*a*, 331*b*, and 332*b*, as illustrated in FIG. 2. Next, the tip of the head portion 1001 of each of the segment sets 33 is fitted in one of the pairs of tines 160 on the bottom of the annular groove 161. The head portions 1001 are oriented outwardly as viewed in the drawing. The straight portions 1002 are placed, like FIG. 5, within slots of the rings 11 and 12.

Subsequently, the rings 11 and 12 are, like the head twisting machine 10 of FIGS. 5 and 6, turned in opposite direction. Simultaneously, the head press plate 16 is moved downward to bend the heads of the segment sets 33 outward. This movement urges the head of the small-sized conductor segment 332 outside the head of the large-sized conductor segment 331 because the head of each of the segment sets 33 is inclined outward within the annular groove 161, and the head press plate 16 abuts only the head of the large-sized conductor segment 331 directly. However, the inner tapered wall 162 of the annular groove 161 works to control or stop an undesirable inward movement of the heads of the large-sized and small-sized conductor segments 331 and 332. Similarly, the outer cylindrical wall 163 works to control or stop an undesirable outward movement of the heads of the large-sized and small-sized conductor segments 331 and 332. This avoids the outward movement of the head of the small-sized conductor segment 331 over the head of the large-sized conductor segment 331 arising from the downward pressing of the head press plate 16.

In the illustrated example, the angle which the head portion 1001 makes with a vertical center line of the head press plate 16 (i.e., the length of the straight portion 1002) before the straight portions 1002 are twisted or spread is smaller than the angle which the inner tapered wall 162 makes with the vertical center line. These angles may alternatively be set equal to each other to eliminate the process of moving the head press plate 16 downward.

During the rotation of the rings 11 and 12, the head portions 1001 are twisted along the inner tapered wall 162, thereby completing the slant portions 3*b* of the segment head-side coil end 311 which lean to the circumferential direction of the stator core 1 at a desired angle without entering inside the inner peripheral surface of the stator core 1.

Figure 14:
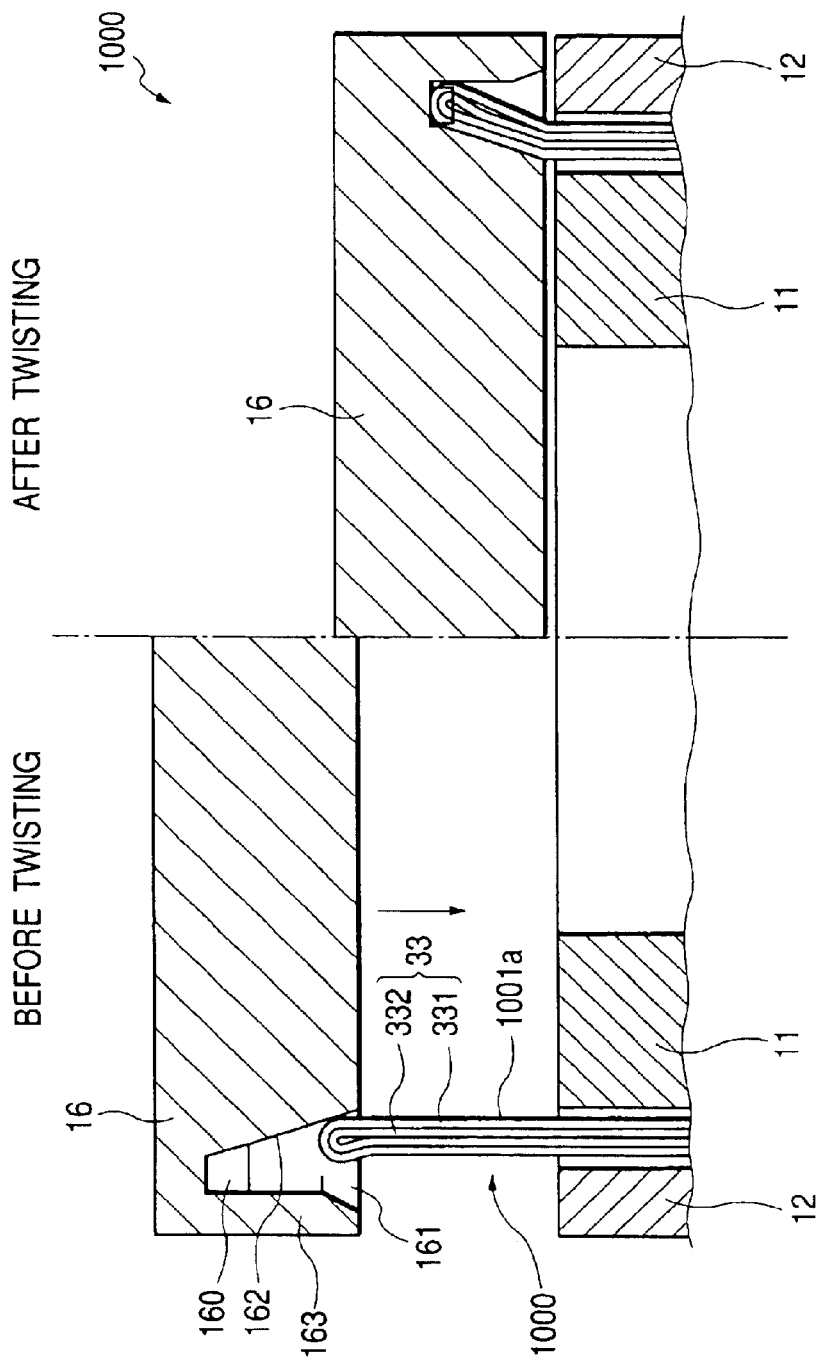
FIG. 14 is a vertical sectional view which shows a head twisting machine using a modified form of conductor segments.

A modification of the head bending process will be described with reference to FIG. 14.

Figure 15:
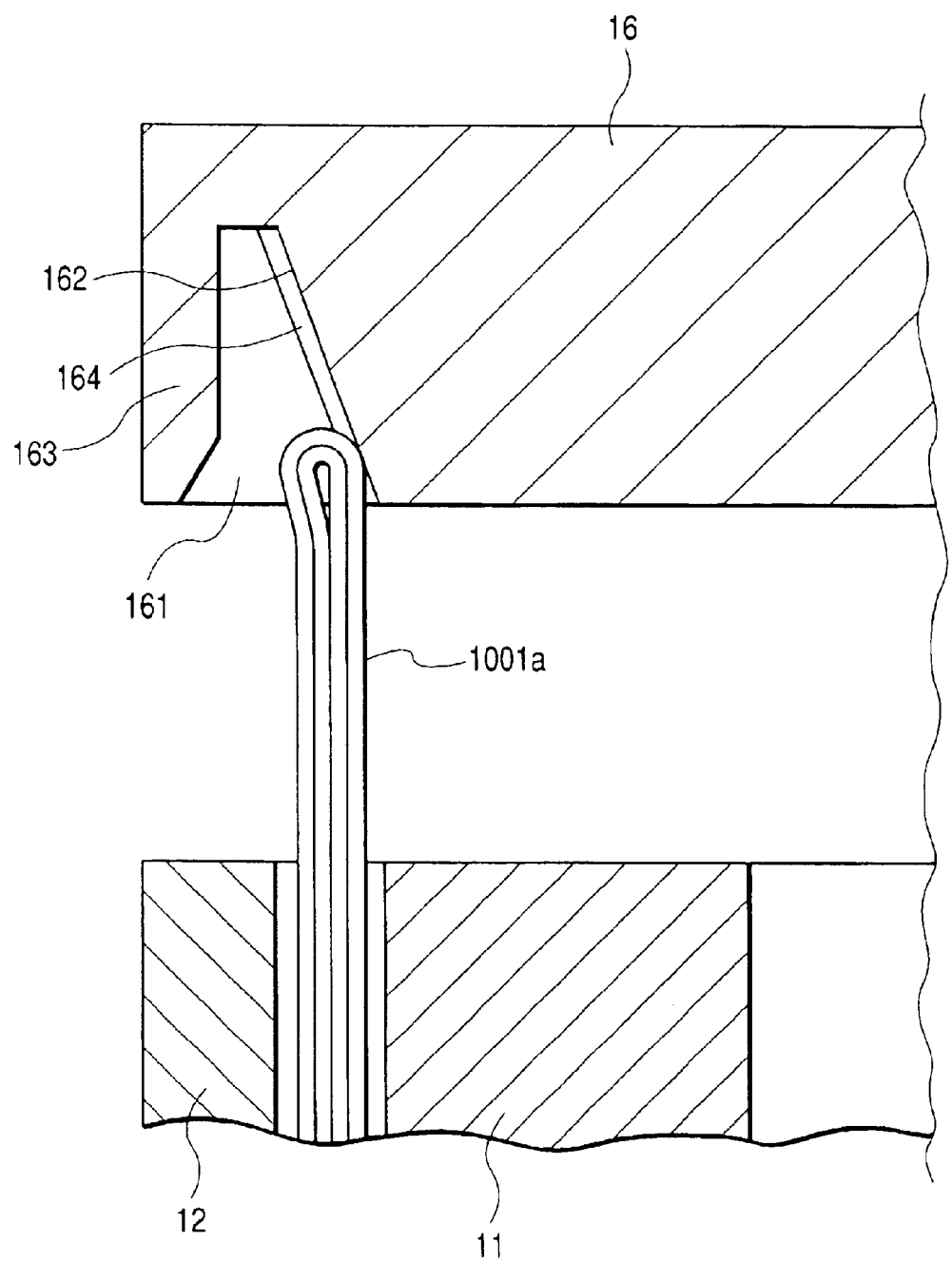
FIG. 15 is a partially enlarge view of FIG. 14.
Figure 16:
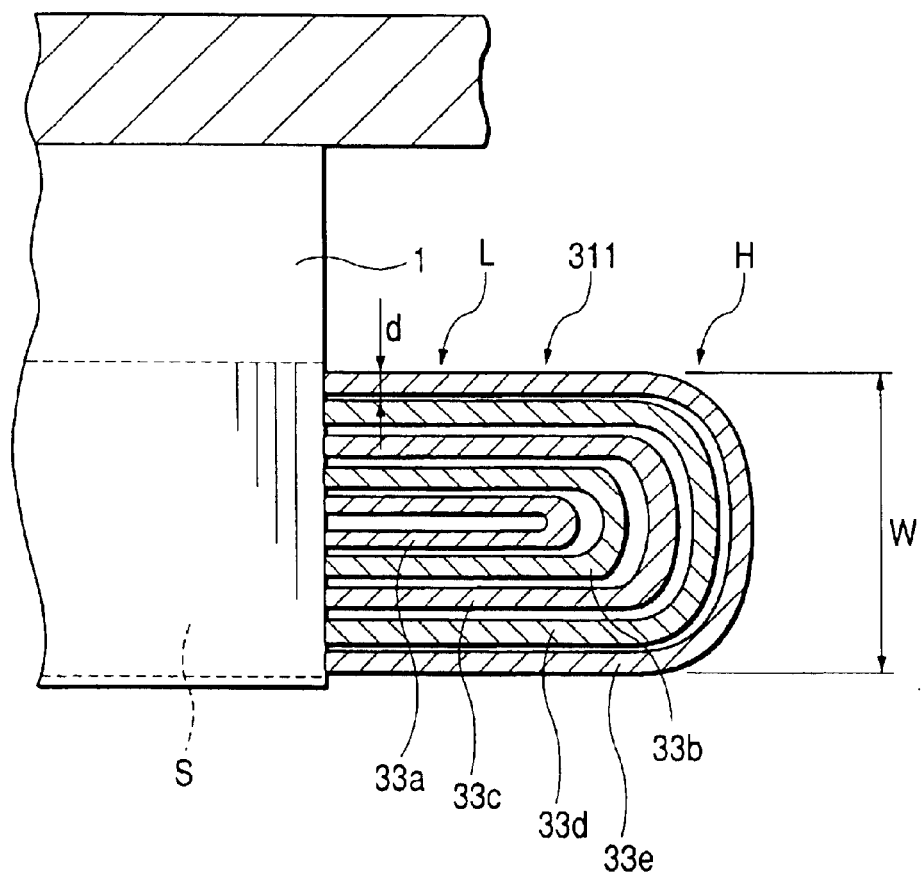
FIG. 16 is a partially sectional view which shows a segment head-side coil end of a conventional stator coil.

First, the segment sets 33 are first prepared each of which is made up of the large-sized and small-sized conductor segments 331 and 332 extending straight, as clearly shown in the drawing. The segment sets 33 are fitted within the rings 11 and 12. Next, the head press plate 16 is moved downward to admit the heads of the segment sets 33 into the annular groove 161. The inner tapered wall 162 abuts the heads of the segment sets 33 to incline or bend them outward. The heads of the segment sets 33 slide the inner tapered wall 162 and enter between the paired tines 160. The rings 11 and 12 are, like the above, turned in opposite directions. The inner tapered wall 162 may have formed therein spiral grooves 164, as illustrated in FIG. 15, working to guide the movement of the heads of the segment sets 33 into the paired tines 160. In this case, the tines 160 may alternatively be omitted. The spiral grooves 164 may have a width substantially identical with that of an inner one, as designated at 1001*a*, of the head portions 1001 of the large-sized conductor segment 331 and each work to twist the inner head portion 1001*a* in the circumferential direction of the annular groove 161. Simultaneously, the inner tapered wall 162 works to subject the inner head portion 1001*a* to an outward inclination.

The spiral grooves 164 are so formed as to contour a desired twist of the inner head portion 1001*a* of the large-sized conductor segment 33. Thus, the heads of the segment sets 33 are so moved in synchronization with the rotation of the ring 11 in the circumferential direction thereof. For example, the spiral grooves 164 are so formed that upon the downward movement of the head press plate 16, the segment head-side coil end 311 is rotated half an angle of rotation of the ring 11.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. A sequentially joined-segment stator coil of a rotary electrical machine comprising:

a stator core having opposed ends and slots formed at given intervals in a circumferential direction of the stator core, each of the slots defining therein even segment-inserted positions which are aligned in a radius direction of said stator core; and a plurality of segments placed in the slots of said stator core, said segments being joined in sequence to form turns of each of M (=an integer more than two) phase coils, each of said segments including a pair of conductor portions each of which is inserted into one of two of the slots spaced from each other at a given interval, a head portion extending from the pair of conductor portions outside one of the ends of said stator core to form a segment head-side coil end, and a pair of end portions each of which extends from one of the pair of conductor portions outside the other end of said stator core to form a segment end-side coil end, each of the head portions being made up of a substantially U-shaped tip portion and a pair of slant portions which continue from ends of the head portion, slant to a circumferential and an axial direction of said stator core, and lead to the conductor portions, respectively, each of the end portions being made up of slant end portions slanting from said two of the slots to the circumferential and axial directions and tips each of which continues from one of the slant end portions and is joined to one of the tips of the end portions of another of the segments, the segment head-side coil end including a plurality of sets of the head portions arrayed in the radius direction of the stator core, as viewed in the circumferential direction of the stator core, the segment end-side coil end including a plurality of sets of the end portions arrayed in the radius direction, as viewed in the circumferential direction of the stator core, wherein each of the tip portions of the head portions of said segments bulges more than a corresponding one of the pairs of conductor portions in the radius direction of said stator core, a radius-wise pitch between two of the tip portions adjacent to each other in the radius direction being greater than a width of the tip portions in the radius direction, and wherein a radius-wise pitch between the slant portions of two of the head portions arrayed adjacent to each other in the radius direction of said stator core is smaller than the width of the tip portions in the radius direction.

2. A sequentially joined-segment stator coil as set forth in claim 1, wherein said radius-wise pitch between the adjacent two head portions at the slant portions thereof increases as getting away from the end of said stator core in an axial direction of said stator core, and wherein outside ones of the pairs of slant portions of the head portions in the radius direction of said stator core lean outwardly at an angle to an axial direction of said stator core which is greater than that of inside ones of the slant portions.

3. A sequentially joined-segment stator coil as set forth in claim 1, wherein said radius-wise pitch between the adjacent two head portions at the slant portions thereof increases as getting away from the end of said stator core in an axial direction of said stator core, and wherein inside ones of the pairs of slant portions of the head portions in the radius direction of said stator core lean inwardly at an angle to an axial direction of said stator core which is greater than that of outside ones of the slant portions.

4. A sequentially joined-segment stator coil as set forth in claim 1, wherein the slant portions of the head portions are bent or curved in the radius direction of said stator core.

5. A sequentially joined-segment stator coil as set forth in claim 1, wherein said segments are broken down into a plurality of segment sets each made up of a small-sized segment with a small head and a large-sized segment with a large head extending over the small head of the small-sized segment in the circumferential direction of the stator core, the segment sets being broken down into a plurality of segment set groups arrayed in the radius direction of the stator core, the segment sets in each of the segment set groups being arrayed in the circumferential direction of the stator core, each of the segment set groups forming partial phase windings to which given phase voltages are applied, respectively, and wherein each of the phase coils includes ones of the partial phase windings which are arrayed in the radius direction of the stator core and joined in series.

6. A sequentially joined-segment stator coil as set forth in claim 5, wherein the slots are broken down into same phase slot groups each of which has placed therein the conductor portions of the segments to which the same phase voltage is applied, the slots in each of the same phase slot groups being arrayed adjacent to each other in the circumferential direction of the stator core, and wherein the partial phase windings arrayed in the radius direction of the stator core within each of the slots of each of the same phase slot groups are joined in series to form a series-connected phase coil circuit, the series-connected phase coil circuits placed respectively within the slots of each of the same phase slot groups being joined in parallel to form each of the phase coils.

7. A sequentially joined-segment stator coil of a rotary electrical machine comprising:

a stator core having opposed ends and slots formed at given intervals in a circumferential direction of the stator core, each of the slots defining therein even segment-inserted positions which are aligned in a radius direction of said stator core; and a plurality of segments placed in the slots of said stator core, said segments being joined in sequence to form turns of each of M (=an integer more than two) phase coils, each of said segments including a pair of conductor portions each of which is inserted into one of two of the slots spaced from each other at a given interval, a head portion extending from the pair of conductor portions outside one of the ends of said stator core to form a segment head-side coil end, and a pair of end portions each of which extends from one of the pair of conductor portions outside the other end of said stator core to form a segment end-side coil end, each of the head portions being made up of a substantially U-shaped tip portion and a pair of slant portions which continue from ends of the head portion, slant to a circumferential and an axial direction of said stator core, and lead to the conductor portions, respectively, each of the end portions being made up of slant end portions slanting from said two of the slots to the circumferential and axial directions and tips each of which continues from one of the slant end portions and is joined to one of the tips of the end portions of another of the segments, the segment head-side coil end including a plurality of sets of the head portions arrayed in the radius direction of the stator core, as viewed in the circumferential direction of the stator core, the segment end-side coil end including a plurality of sets of the end portions arrayed in the radius direction, as viewed in the circumferential direction of the stator core, wherein each of the tip portions of the head portions of said segments bulges more than a corresponding one of the pairs of conductor portions in the radius direction of said stator core, a radius-wise pitch between two of the tip portions adjacent to each other in the radius direction being smaller than a width of the tip portions in the radius direction, and wherein sections of the tip portions having a maximum width in the radius direction of said stator core are shifted in location from each other in the axial direction of said stator core.

8. A sequentially joined-segment stator coil as set forth in claim 7, wherein two of the tip portions of the head portions arrayed adjacent to each other in the radius direction of said stator core are shifted from each other in the axial direction of said stator core a distance longer than a length of the tip portions in the axial direction of said stator core.

9. A sequentially joined-segment stator coil as set forth in claim 7, wherein said segments are broken down into a plurality of segment sets each made up of a small-sized segment with a small head and a large-sized segment with a large head extending over the small head of the small-sized segment in the circumferential direction of the stator core, the segment sets being broken down into a plurality of segment set groups arrayed in the radius direction of the stator core, the segment sets in each of the segment set groups being arrayed in the circumferential direction of the stator core, each of the segment set groups forming partial phase windings to which given phase voltages are applied, respectively, and wherein each of the phase coils includes ones of the partial phase windings which are arrayed in the radius direction of the stator core and joined in series.

10. A sequentially joined-segment stator coil as set forth in claim 9, wherein the slots are broken down into same phase slot groups each of which has placed therein the conductor portions of the segments to which the same phase voltage is applied, the slots in each of the same phase slot groups being arrayed adjacent to each other in the circumferential direction of the stator core, and wherein the partial phase windings arrayed in the radius direction of the stator core within each of the slots of each of the same phase slot groups are joined in series to form a series-connected phase coil circuit, the series-connected phase coil circuits placed respectively within the slots of each of the same phase slot groups being joined in parallel to form each of the phase coils.

11. A sequentially joined-segment stator coil of a rotary electrical machine comprising:

a stator core having opposed ends and slots formed at given intervals in a circumferential direction of the stator core, each of the slots defining therein even segment-inserted positions which are aligned in a radius direction of said stator core; and a plurality of segments placed in the slots of said stator core, said segments being joined in sequence to form turns of each of M (=an integer more than two) phase coils, each of said segments including a pair of conductor portions each of which is inserted into one of two of the slots spaced from each other at a given interval, a head portion extending from the pair of conductor portions outside one of the ends of said stator core to form a segment head-side coil end, and a pair of end portions each of which extends from one of the pair of conductor portions outside the other end of said stator core to form a segment end-side coil end, each of the head portions being made up of a substantially U-shaped tip portion and a pair of slant portions which continue from ends of the head portion, slant to a circumferential and an axial direction of said stator core, and lead to the conductor portions, respectively, each of the end portions being made up of slant end portions slanting from said two of the slots to the circumferential and axial directions and tips each of which continues from one of the slant end portions and is joined to one of the tips of the end portions of another of the segments, the segment head-side coil end including a plurality of sets of the head portions arrayed in the radius direction of the stator core, as viewed in the circumferential direction of the stator core, the segment end-side coil end including a plurality of sets of the end portions arrayed in the radius direction, as viewed in the circumferential direction of the stator core, wherein each of the tip portions of the head portions of said segments bulges more than a corresponding one of the pairs of conductor portions in the radius direction of said stator core, a radius-wise pitch between two of the tip portions adjacent to each other in the radius direction being smaller than a width of the tip portions in the radius direction, and wherein sections of the tip portions having a maximum width in the radius direction of said stator core are shifted in location from each other in the circumferential direction of said stator core.

12. A sequentially joined-segment stator coil as set forth in claim 11, wherein two of the tip portions of the head portions arrayed adjacent to each other in the radius direction of said stator core are shifted from each other in the circumferential direction of said stator core a distance longer than a length of the tip portions in the circumferential direction of said stator core.

13. A sequentially joined-segment stator coil as set forth in claim 11, wherein said segments are broken down into a plurality of segment sets each made up of a small-sized segment with a small head and a large-sized segment with a large head extending over the small head of the small-sized segment in the circumferential direction of the stator core, the segment sets being broken down into a plurality of segment set groups arrayed in the radius direction of the stator core, the segment sets in each of the segment set groups being arrayed in the circumferential direction of the stator core, each of the segment set groups forming partial phase windings to which given phase voltages are applied, respectively, and wherein each of the phase coils includes ones of the partial phase windings which are arrayed in the radius direction of the stator core and joined in series.

14. A sequentially joined-segment stator coil as set forth in claim 13, wherein the slots are broken down into same phase slot groups each of which has placed therein the conductor portions of the segments to which the same phase voltage is applied, the slots in each of the same phase slot groups being arrayed adjacent to each other in the circumferential direction of the stator core, and wherein the partial phase windings arrayed in the radius direction of the stator core within each of the slots of each of the same phase slot groups are joined in series to form a series-connected phase coil circuit, the series-connected phase coil circuits placed respectively within the slots of each of the same phase slot groups being joined in parallel to form each of the phase coils.

* * * * *